United States Patent
Sutherland et al.

(10) Patent No.: US 9,997,092 B2
(45) Date of Patent: *Jun. 12, 2018

(54) PRESENTATION SYSTEM WITH MOVABLE DISPLAY DEVICES

(71) Applicant: CROSSWING INC., Markham (CA)

(72) Inventors: Stephen Sutherland, Markham (CA); Dale Wick, Markham (CA)

(73) Assignee: CrossWing Inc., Aurora, ON (*) Notice: Subject to any disclaimer, the term of this patent is extended or adjusted under 35 U.S.C. 154(b) by 0 days. days.

This patent is subject to a terminal disclaimer.

(21) Appl. No.: 15/259,867

(22) Filed: Sep. 8, 2016

(65) Prior Publication Data

US 2017/0032715 A1 Feb. 2, 2017

Related U.S. Application Data

(63) Continuation of application No. 13/504,599, filed as application No. PCT/CA2010/001721 on Oct. 29, 2010, now Pat. No. 9,443,451.

(30) Foreign Application Priority Data

Oct. 30, 2009 (CA) .................................. 2684192

(51) Int. Cl.
    *H05K 5/00* (2006.01)
    *G09F 9/37* (2006.01)
    (Continued)

(52) U.S. Cl.
CPC .............. *G09F 9/37* (2013.01); *B25J 9/0084* (2013.01); *B25J 9/106* (2013.01); *G06F 3/1446* (2013.01);
(Continued)

(58) Field of Classification Search
CPC . G09F 9/37; G09F 9/3026; G09F 9/33; G09F 9/35; G06T 7/246; B25J 9/0084;
(Continued)

(56) References Cited

U.S. PATENT DOCUMENTS 5,687,499 A 11/1997 Bmjac
6,339,969 B1 1/2002 Salcudean et al.
(Continued)

FOREIGN PATENT DOCUMENTS

WO 2004028753 A2 4/2004

*Primary Examiner* — Robert J Hoffberg
*Assistant Examiner* — Hung Dang

(57) ABSTRACT

The present system and method provides for a new digital media paradigm enabling tight choreography of motion, content and, time able to be presented on a variety of hardware platforms consisting of robotic control of a multiplicity of display screens in the form of a movable array of 2 or more LCDs, LEDs, OLEDs, etc., with the movement and placement of each display achieved by one multi-axis manipulator arm mechanism. Motion control is achieved through software programmed onto one or more controller systems, and the corresponding tools necessary for creative visual designers to produce content meeting this new paradigm are also proposed. Each arm/display screen combination is kept aware of its positioning in physical space, relative to the positioning of each and every other arm/display screen at all times, in order to prevent collisions. The pre-programmed software control takes the form of a choreographed playlist of movements, content, and time that match the desired positioning of the array of display screens, in order to achieve the desired dynamic presentation of custom-produced digital content that will be presented across the array, in a fully coordinated fashion.

10 Claims, 27 Drawing Sheets

(51) Int. Cl.
  *B25J 9/00*    (2006.01)
  *B25J 9/10*    (2006.01)
  *G09F 9/35*    (2006.01)
  *G09F 19/02*   (2006.01)
  *G09F 9/302*   (2006.01)
  *G06F 3/14*    (2006.01)
  *G06K 9/00*    (2006.01)
  *G09F 9/33*    (2006.01)
  *G06T 7/246*   (2017.01)

(52) U.S. Cl.
  CPC ..... *G06K 9/00335* (2013.01); *G06K 9/00362* (2013.01); *G06T 7/246* (2017.01); *G09F 9/3026* (2013.01); *G09F 9/33* (2013.01); *G09F 9/35* (2013.01); *G09F 9/372* (2013.01); *G09F 9/377* (2013.01); *G09F 19/02* (2013.01); *G06T 2207/30196* (2013.01)

(58) Field of Classification Search
  CPC ...... B25J 9/106; G06F 3/1446; G06F 1/1656; G06K 9/00335; G06K 9/00362
  See application file for complete search history.

(56) References Cited

U.S. PATENT DOCUMENTS

| | | |
|---|---|---|
| 6,695,270 B1 | 2/2004 | Smed |
| 7,168,748 B2 | 1/2007 | Townsend et al. |
| 9,443,451 B2 * | 9/2016 | Sutherland ............. B25J 9/0084 |
| 2005/0179618 A1 | 8/2005 | Oh |
| 2012/0224311 A1 | 9/2012 | Sutherland et al. |

\* cited by examiner

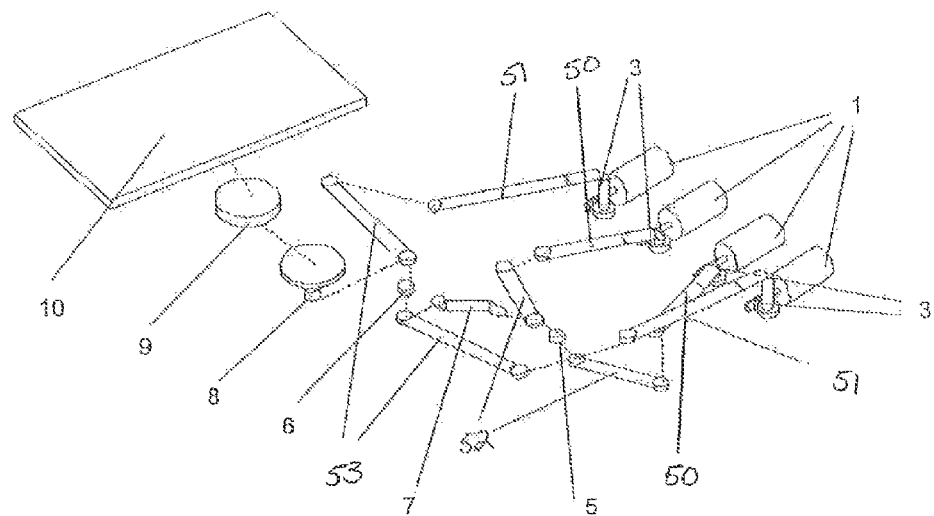
Figure 1
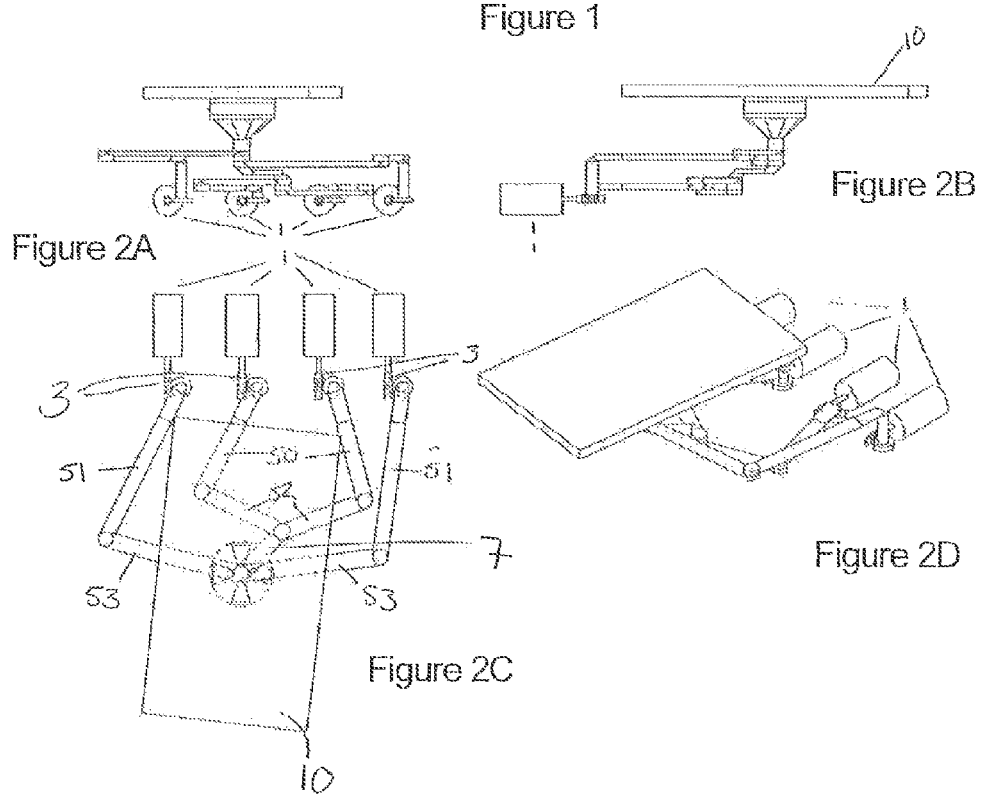
Figure 2A
Figure 2B
Figure 2C
Figure 2D

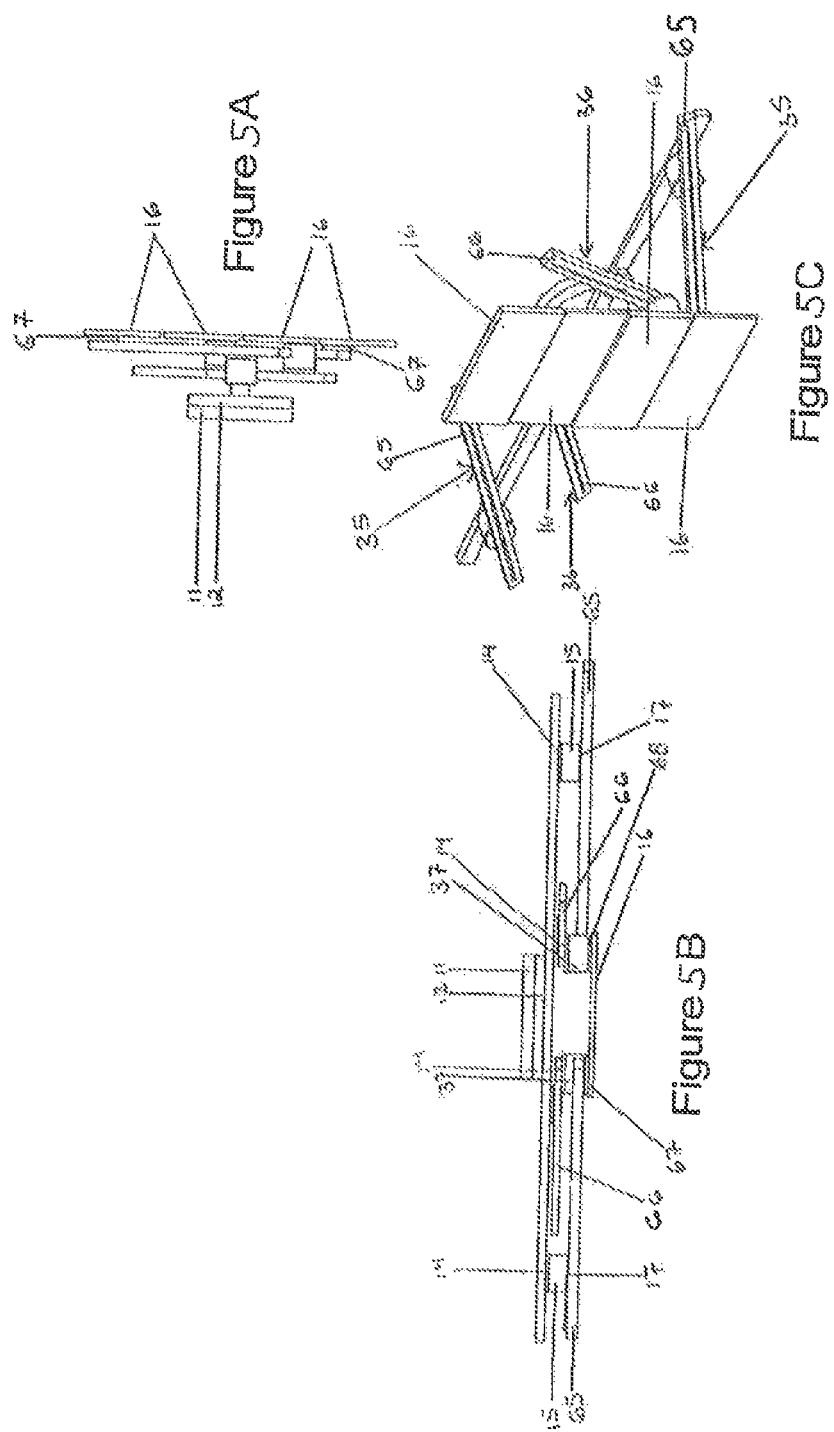

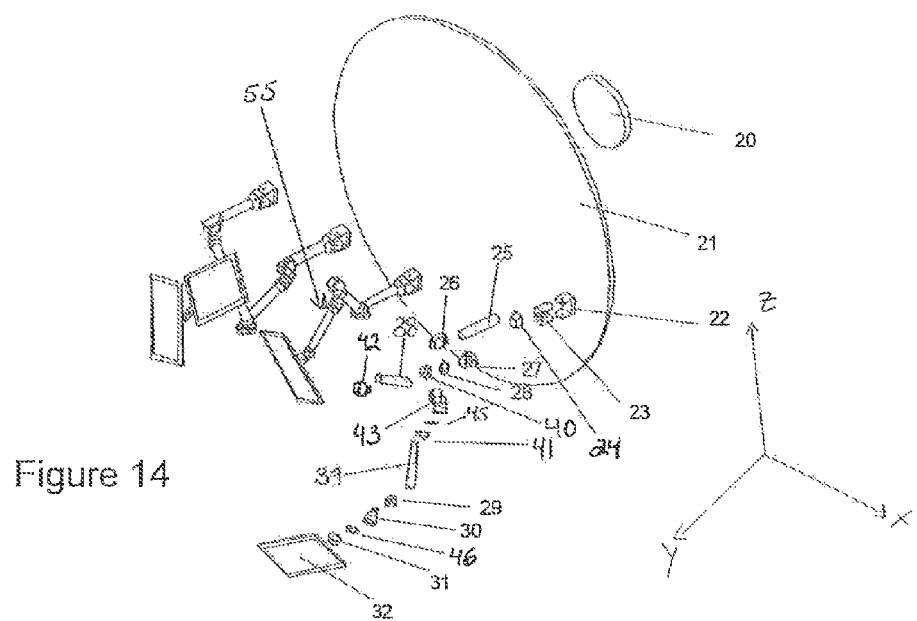
Figure 14
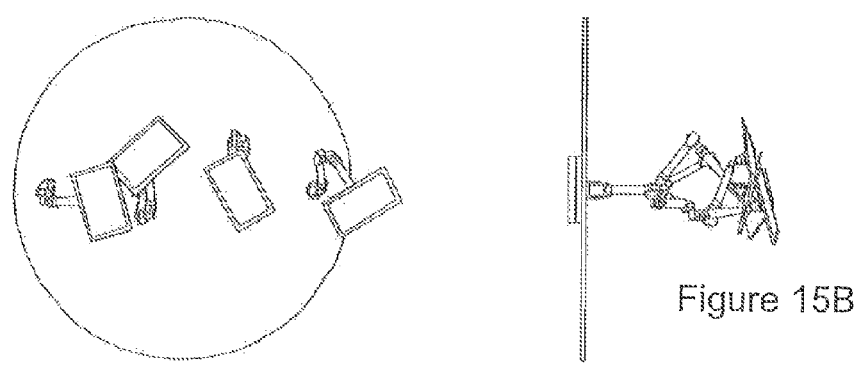
Figure 15A
Figure 15B
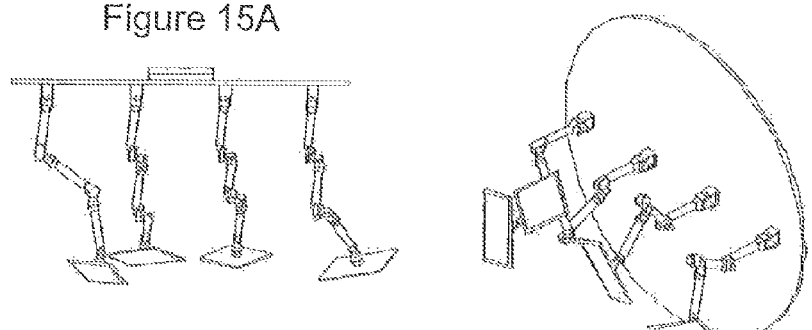
Figure 15C
Figure 15D

PRESENTATION SYSTEM WITH MOVABLE DISPLAY DEVICES

RELATED APPLICATIONS

This application is a continuation application of pending application Ser. No. 13/504,599 filed Apr. 27, 2012 entitled PRESENTATION SYSTEM WITH MOVABLE DISPLAY DEVICES.

FIELD OF THE INVENTION

This invention relates to signage, presentation and display systems that include movable display devices controlled to alter the orientation and spacial relationship of the display devices.

BACKGROUND TO THE INVENTION

Many attempts have been made to design novel signage and presentation systems that entertain, as well as inform and instruct, viewers. Content providers and advertisers continuously seek engaging mediums to differentiate their message amid the plethora of visual and audible commotion. Prior art in the field of advertisings displays is extensive, however most advertising mediums can be categorized into 4 groups including traditional non-digital signage, electronic signage, projection signage and interactive signage.

Traditional non-digital displays typically consist of one or more stiff flat or curved substrates made with materials such as paper, cardboard, wood, plastic, vinyl, fabric, metal and Plexiglas. These substrates are imprinted with desired visual content commonly including coloured text and graphics. Many of these systems are back-lit typically by mounting a translucent substrate carrying the visual content on a light box lit with florescent or LED lights contained within. A more economical approach is to light from the front for night and low ambient light viewing.

Many efforts have been made to overcome the static nature of non-digital displays. Sometimes a 3D effect is achieved by fixing carved, moulded, or neon tube letters and shapes on top of the substrate or by etching, moulding or carving such information into the substrate surface. Extreme 3D effects, whereby the designer superimposes a large 3D object on top of the substrate, is used to attract viewers. The use of motors to move or shake such physical object in a repetitive fashion is also known. These 3D effects can also be augmented during night viewing by careful application of various lighting techniques to create an illusion of motion.

Changing non-digital installations with new content is a labour and material intensive process. Content is typically fixed for a period of time spanning months or possibly years. However, in cases such as flip-charts and various shutter billboard systems, additional content is available by flipping to the next page of a chart or, in the case of shutter billboard systems, by striping content across adjoining vertical or horizontal blinds (which are double or triple sided) such that when the blinds are synchronized during rotation, the complete content for any one given sign appears to be seamlessly displayed. In some cases, the content from one side relates to the other side's content, so a simple story may be told. Lenticular screens are also installed to achieve a similar effect, enable the viewer to see different sets of vertically striped images from varying reading angles—sometimes even presenting each eye with slightly different viewpoints, forming three-dimensional views of the static scene.

Electronic signage and presentation systems replace traditional substrates with one or more planar digital electronic display panels (plasma, LCD, OLED, LED, etc.) and associated circuitry capable of forming a quality rendering of the content received in digital or analog form. Typically displaying pre-recorded content streams blending motion video with sequences of still images with additional text or other graphic content optionally rendered in real-time (eg: time and temperature superimposed on electronic billboards), some such systems also deliver corresponding audio information via an array of one or more speakers. Although less common, electronic displays may also be made of flexible substrates, including fabrics with embedded LEDs, which are used to cover non-planar surfaces. To expand the field of view, which is a significant limitation, particularly for LCD technology, electronic displays are often mounted back-to-back or at 30, 45 or 90 degree angles around pillars.

Installation and maintenance costs are much higher than traditional non-digital displays, particularly for larger-format applications. However, the ease to re-skin digital signage instantly with new content streams coupled with the medium's ability to play catchy motion video and animations, even outdoors in full sunlight, has made them increasingly popular choices for both advertisers and sports venues alike. But this popularity, coupled with broad consumer adoption of larger flat panel televisions within their homes, is now diminishing the ability of all but the largest of these electronic display systems to standout, wow or entertains viewers.

Projection signage and presentation systems use either analog video or digital projectors to beam rendered content onto reflective screens which although commonly flat, may also be convex or concave. Typically larger than their digital display cousins, projection systems suffer the same challenges in attracting waning consumer attention. Attempts to grab more attention include the use of some such systems to project onto the outside or inside of transparent globes or other objects including waterfalls and mist walls. Multiple projectors are also used where larger screens or 360 degree display is deployed. Projection systems are typically deployed in indoor areas, since ambient light reflected from such screens greatly lowers impact and readability of the content.

Interactive signage and presentation systems, the newest medium available to creative designers, augment the digital stream flowing to the display by dynamically altering content based on either direct input from the viewer, or passive means. Direct input is typically captured via an attached keyboard or touch screen apparatus, but may also include control of the content via a cell-phone touch screen or keypad, or via laser or optical pointer devices. Indirect methods, including motion sensor and RFID tag readers, also provide the ability for attached processing circuitry to dynamically modify the content based on viewer proximity or known viewer profiles.

A prior art system involving moving display screens is shown in U.S. Pat. No. 6,339,969. This system includes display screens movable in a linear manner.

Beyond media limitations, creative visual designers working with content providers and advertisers to vie for consumer attention are also restricted by the fact that in each of the above mediums, common digital media paradigms (eg: bitmap, vector, and video) and tools (eg: Adobe Illustrator, PhotoShop and Flash) are used to design and produce the content. Although this commonality facilitates training and communication of both ideas and completed works, the inherent lack of differentiation, at the media and tool levels, exacerbates the challenge for the creative designer attempting to deliver a message which dearly stands out from the competition.

The push to differentiate while staying within the confines of existing digital media paradigms has recently reached absurd proportions. Initially, projects such as a continuous ring of digital signage running around a stadium at balcony level seemed like a great way to capture audience attention for special advertising and entertainment during halted play—but now, for example, some soccer stadiums operate brightly lit digital displays at field level, distracting players and at the same time making it virtually impossible for play-by-play cameras to correctly adjust exposure for best televised quality of the focal sporting event itself.

The multitude of signage and presentation systems bound by current display techniques competing for consumer attention has made it increasingly difficult for advertisers to stand out. Many venues seeking corporate sponsorships are pushing the envelope on existing approaches with brighter, sharper and larger displays appearing to be the only differentiating factors, each with diminishing gains as the techniques mature. Accordingly, there remains a need for a new medium coupled with new tools through which content providers and advertisers can standout, yet clearly deliver their message while entertaining their viewers.

SUMMARY OF THE INVENTION

A visual display system according to the present invention comprises a plurality of electronic display devices, a separate support arrangement for each electronic display device connected to a motor drive arrangement that accommodates movements of each electronic display device to change the orientation thereof and to accommodate substantial movement of the respective display device along first and second axes from a neutral position to any of a series of positions including relative to the second axis. The separate support arrangement for each electronic display device further accommodates substantial movement of the respective display device along a third axis. The plurality of display devices, via the motor drive arrangement, are each controlled to move within a three dimensional display space in a coordinated manner and to accommodate a change in order of the display devices within the display space.

In an aspect of the invention, each separate support arrangement accommodates pivotal movement of each display device.

According to an aspect of the invention, the three dimensional display space has a dominate plane of movement defined by the first and second axes.

In a further aspect of the invention each separate support arrangement allows rotation of the display devices within the display space such that a viewing direction perpendicular to the display devices can be altered as part of the movement of each display device.

In a preferred aspect of the invention, each separate support arrangement accommodates angling of the display device for multi-plane viewing of the display devices in the display space.

A further embodiment of the invention is characterized in that each display device is movable along said first axis to at least positions either side of said neutral position and movable along said second axis to at least positions either side of said neutral position including stacked positions.

In yet a further aspect of the invention the separate support for each display device includes a pivot connection accommodating pivotal movement of the display device about a position that is offset relative to a central axis of the display device.

In a further aspect of the invention, each separate support includes a control bar linkage for controlling the movement and position of the respective display device.

In yet a further aspect of the invention, the pivot connection of each display device is located adjacent a rear corner of the display device.

In a further embodiment of the invention the plurality of display devices includes at least 4 display devices. The display devices are collectively movable to define an overall presentation area at least 3 times the area of said display devices.

In yet a further aspect of the invention, the separate support for each display device includes a pivot connection accommodating pivotal movement of the display device about a position that is offset relative to a central axis of the display device.

In yet a further aspect of the invention, the separate support for each display device includes a motor actuator controlling the separate support and thereby controlling the position and movement of the respective display device in the display area.

A further aspect of the invention includes a computer controller providing control signals for each motor actuator to determine the relative position and movement of the display devices.

In yet a further aspect of the invention, the motor actuators are mounted on a rotatable member extending generally parallel to and centrally located behind the display area such that rotation of the rotatable member causes rotation of the display devices.

A different aspect of the present invention includes a visual display system comprising a plurality of display devices and a mounting system for the display screens accommodating substantial movement of the display screens with respect to at least two axes of movement. The movable display screens define a display screen space corresponding to the set of possible relative positions of the display screens wherein the display screen space is at least three times the cumulative area of said individual display screens.

In a further aspect of the invention, the plurality of display screens is at least 3 display screens. These display screens are movable to alter the relative order of the display screens with respect to at least one of said at least two axes of movement.

In yet a further aspect of the invention, the mounting system for a plurality of said display screens includes an attachment structure for each display screen allowing rotation of the respective display screen about an off center position thereof.

In yet a further aspect of the invention, the rotation of each display screen about the respective off center position rotates said display screen in a plane generally defined by two axes of said at least two axes of movement.

In yet a further aspect of the invention the attachment structure for each display screen is located adjacent to a corner of the respective display screen.

In yet a further aspect of the invention, each display screen is a generally rectangular, planar electronic display screen.

In yet a further aspect of the invention, each display screen is a generally circular, planar electronic display screen.

In yet a further aspect of the invention, each display screen is non-planar.

In yet a further aspect of the invention, the display screens have two major axes of movement to define a generally planar display.

In yet a further aspect of the invention, the plurality of display screens are at least 4 electronic display screens and the electronic display screens have two major axes of movement to collectively define a generally planar display. The mounting structure for each display screen allows an off center rotation of the display screen and movement of the display screen in the planar display.

In yet a further aspect of the invention, the mounting arrangement includes a main support member supporting a control linkage for each display screen, and the main support is rotatable about a central point defining an axis of rotation generally perpendicular to the generally planar display.

In yet a further aspect of the invention, the mounting arrangement includes a back support structure that accommodates movement of the display screens within the general area of the back support structure. The mounting arrangement moves across a rear surface of the back support structure and provides a structural connection through the back support structure.

BRIEF DESCRIPTION OF THE DRAWINGS

Preferred embodiments of the invention are shown in the drawings, wherein:

FIG. 1 is an exploded view of the compact planar manipulator.

FIG. 2A-D are a set of orthogonal views of the compact planar manipulator including A) a front view, B) a side view, C) a top view and D) a perspective view.

FIG. 5A-C are a set of orthogonal views of the three degree-of-freedom parallel manipulator including A) a side view, B) a top view, and C) a perspective view.

FIG. 14 is an exploded view of the six degree-of-freedom robotic arm manipulator.

FIG. 15A-D are a set of orthogonal views of the six-degree-of-freedom robotic arm manipulator including A) a front view, B) a side view, C) a top view and D) a perspective view.

DETAILED DESCRIPTION OF THE PREFERRED EMBODIMENTS

Figure 3A:
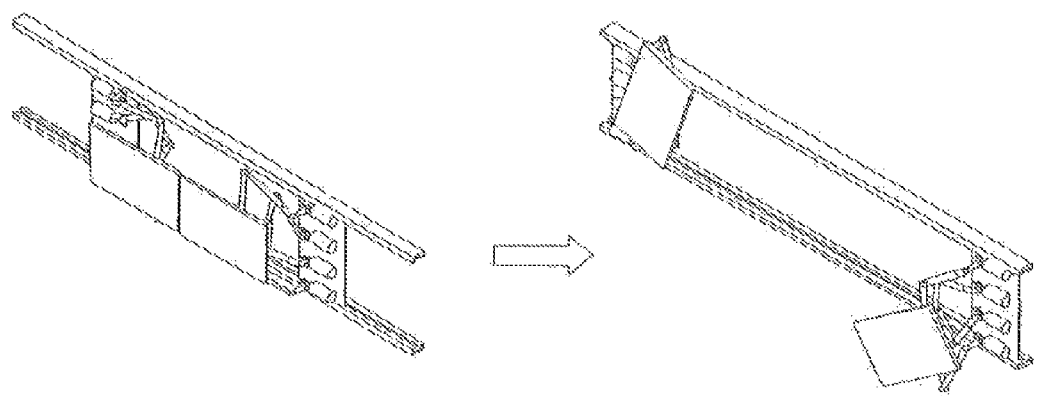
FIG. 3A-B depicts the compact planar manipulator mounted onto a railing system.

The presentation system will be described with respect to the hardware of the system. The system will subsequently be described in combination with preferred software component for controlling the moving display devices.

Hardware

There are several ways to mount the display devices (preferably electronic display screens) to accommodate various degrees of mobility and a variety of different visual effects. Three preferred embodiments, including the compact planar manipulator, the 3 degree of freedom planar manipulator and the 6 degree of freedom planar manipulator will be described. Each of these embodiments include two or more display screens. It should be noted that although the use of a screen as a display device is the preferred embodiment, other possible display devices could include LCD, Plasma, OLED, and 3D lenticular screens or other technologies such as projectors, flexible display panels to created shaped surfaces (for example convex, concave, tubular, conical and spherical) or LED's on a plurality of rods which can move in the z-axis to create a 3-D image. Display devices could also consist of combinations of the above devices or alternative display devices. In the example of mobile projectors a screen is provided behind the device and the projected image moves with movement of the projector. It is also possible to use different display devices in combination.

The compact planar manipulator system enables the motion of a screen in a single plane. It can be used independently to form a single screen display or multiple compact planar manipulators can be used together to have a multiple screen display. Each compact planar manipulator (as seen in FIG. 1 and FIG. 2A-D) is driven by 4 DC-motors 1. Each motor is responsible for driving either an inside lower arm 50 or an outside lower-arm 51. Each lower-arm, both inside 50 and outside, has two ends including a proximal and distal end. Since the rotation of the motor gear-shaft and the rotation of the lower-arms (50 and 51) take place in perpendicular planes, the motion of the lower-arms (50 and 51) is controlled by the motor with a worm-gear apparatus 3. The worm-gear apparatus 3 connects the motor gear-shaft to the proximal end of a lower-arm. The distal end of the inside lower-arm 50 is connected to the proximal end of an inside upper-arm 52. The distal end of the outside lower arm 51 is connected to the proximal end of an outside upper-arm 53. The connection between the lower-arms and upper-arms is not actuated. The distal ends of both the inside 52 upper-arms then connect to one of the circular faces of a spacer 5. The other face of the spacer 5 attaches to one end of a crank shaft 7. The other end of the crank shaft 7 connects to a second spacer 6. The two outside arms 51 connect together and to spacer 6.

A flat-panel mount 8 is attached to one of the outer-arm systems at spacer 6. The mount supports a rotary (pancake) motor 9, which in turn is attached to the flat-panel screen 10 or television which may be of any commercially-available technology including LCD, Plasma, LED, OLED, and 3D lenticular or other technologies. The robotic mechanism, excluding the panel and its accessories, allows for intricate planar motion through the precise control of the 4 motors. The limits of the planar motion are set by the lengths of the lower-arms and upper-arms, as well as the length of the crankshaft. Finally, the rotary (pancake) motor 9 adds extra rotational freedom to the panel, enabling the designer to achieve more elaborate and attention-grabbing motions.

Figure 3B:
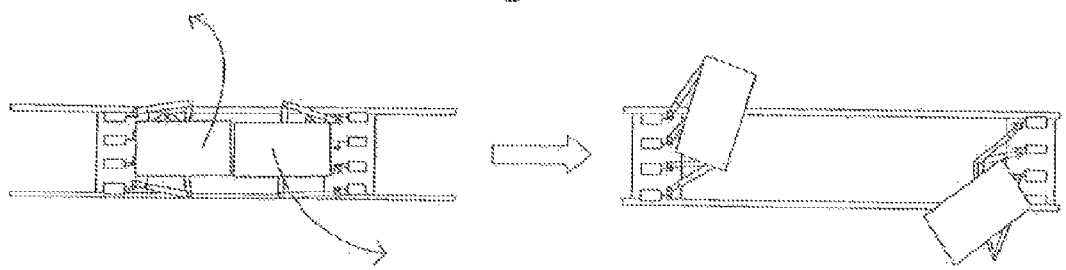
Figure 4:
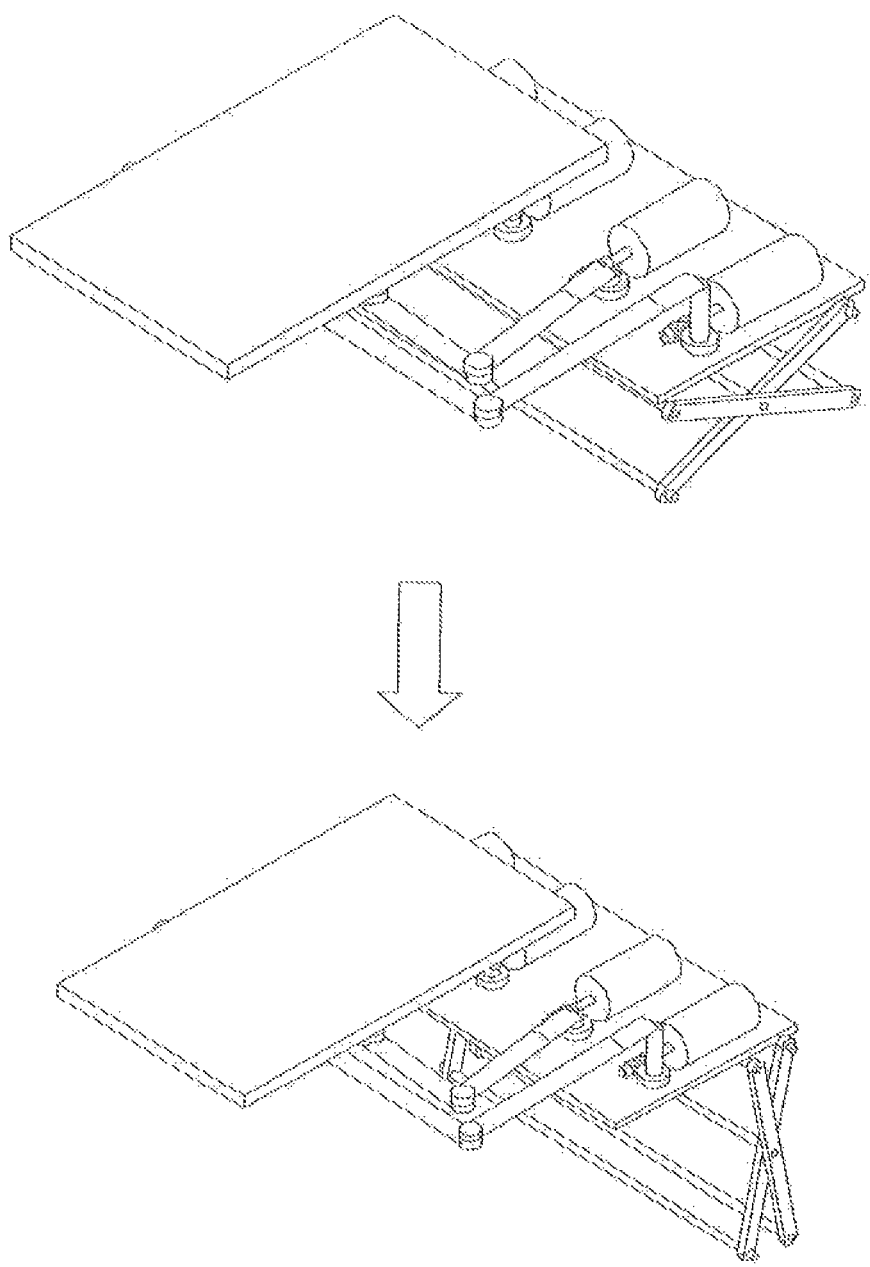
FIG. 4 depicts the compact planar manipulator mounted onto a scissor lift-type mechanism.
Figure 6A:
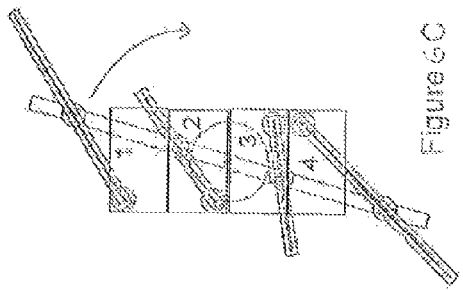
FIG. 6A-D are a set of frontal views of the three degree-of-freedom parallel manipulator, where the screens remain stationary and the hardware behind the screens is moved.
Figure 6B:
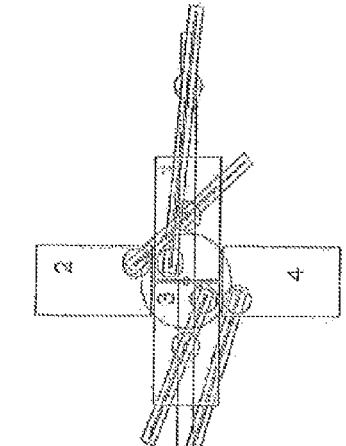
Figure 6C:
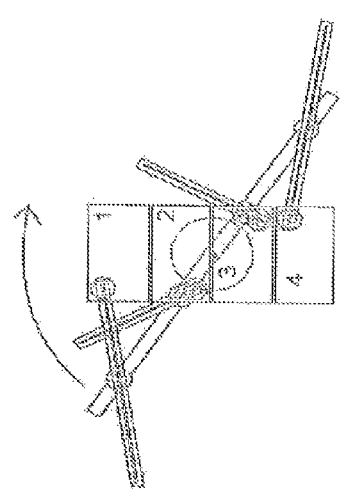
Figure 6D:
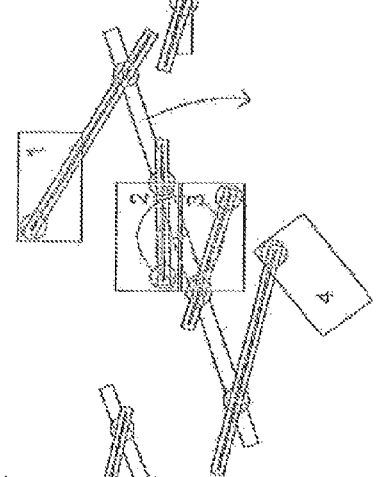
Figure 6E:
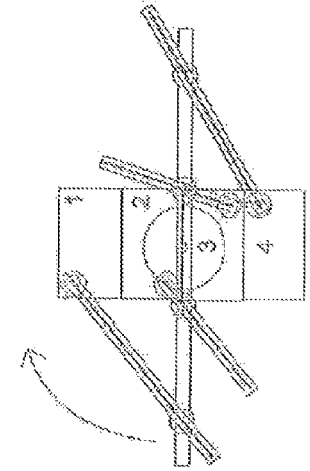
FIG. 6E shows the beginning of the motion of the screens in order to end up in a plus-pattern, as depicted in FIG. 6F.
Figure 6F:
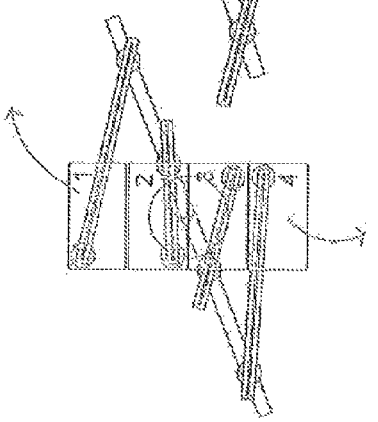

The compact planar manipulator is ideal for advertising areas with limited space. The system can act as a standalone unit, or can be linked up with other systems like it, to create a chain of moving advertisements. Other possibilities include, mounting the manipulator on a railing system, allowing the screen to follow a viewer along a path, as well as incorporating a scissor-lift type mechanism to allow the manipulator to travel towards and away from the viewer. These depictions can be seen in FIG. 3A-B and FIG. 4 respectively.

The three degree-of-freedom planar manipulator (as seen in FIG. 5A-C) allows more maneuverability compared to the compact planar manipulator. This configuration allows for more complex interactions with a plurality of screens, preferably 4 screens. The system is attached to the wall, ceiling or other support structure via a wall mount 11. A high-torque rotary (pancake) motor 12 is responsible for rotating the entire system. The mounting bar 13, which attaches to the rotary motor 12, provides a mounting surface for four smaller high-torque motors 14. Each small high-torque motor 14 is attached to an arm system. Each arm system has one of 2 configurations. The outer arm systems 35 share the same configuration, while the inner two arm systems 36 have a second configuration. Each configuration will be described separately.

In the outer arm configuration, a spacer 15 is attached to the high-torque motor 14. The spacer 15 is used to allow the outer arms 65 to rotate over the inner arms 66 without colliding, while keeping all the television screens (16) in the same plane. A motor-track system (17) is attached to the spacer 15. The outer arm 65 is slidably attached to the motor track 17 thereby allowing the outer arm to slide along its length. A second rotary motor 67 is attached to the end of the outer arm 65 and is fixed to a television screen 16, which allows for controlled rotation of the screen.

The inner arm systems 36 have a similar configuration to the outer arm system 35 with the exception of the location of the spacer. The high-torque motor 14 has a motor-track 17 fixed to it. This is slidably attached to the inner arm 66 and allows for sliding of the arm along its length. A spacer 37 is attached between the end of the inner arm and a second rotary motor 68. The second rotary motor is then fixed to a television screen 16.

The television screens 16 at the end of both the inner 65 and outer arms 66 can be mounted to the arms at any position on the back of the screens; however the preferred mounting position is a corner of the screen.

This configuration allows for the system to keep the positions of the screens fixed, while re-orienting the hardware behind the screens. This is critical as the closing position of one choreography sequence can be held steady while the system is setting up for the next "scene", where the subsequent motion requires a certain hardware starting point. Various hardware configurations for the same screen configuration are shown in FIGS. 6A-F. The versatility and flexibility of the hardware, as well as the ranges of motion possible when orienting the screens allows designers to create either the most efficient path-plans or the most visually appealing motions, depending on their applications and preferences.

Figure 7:
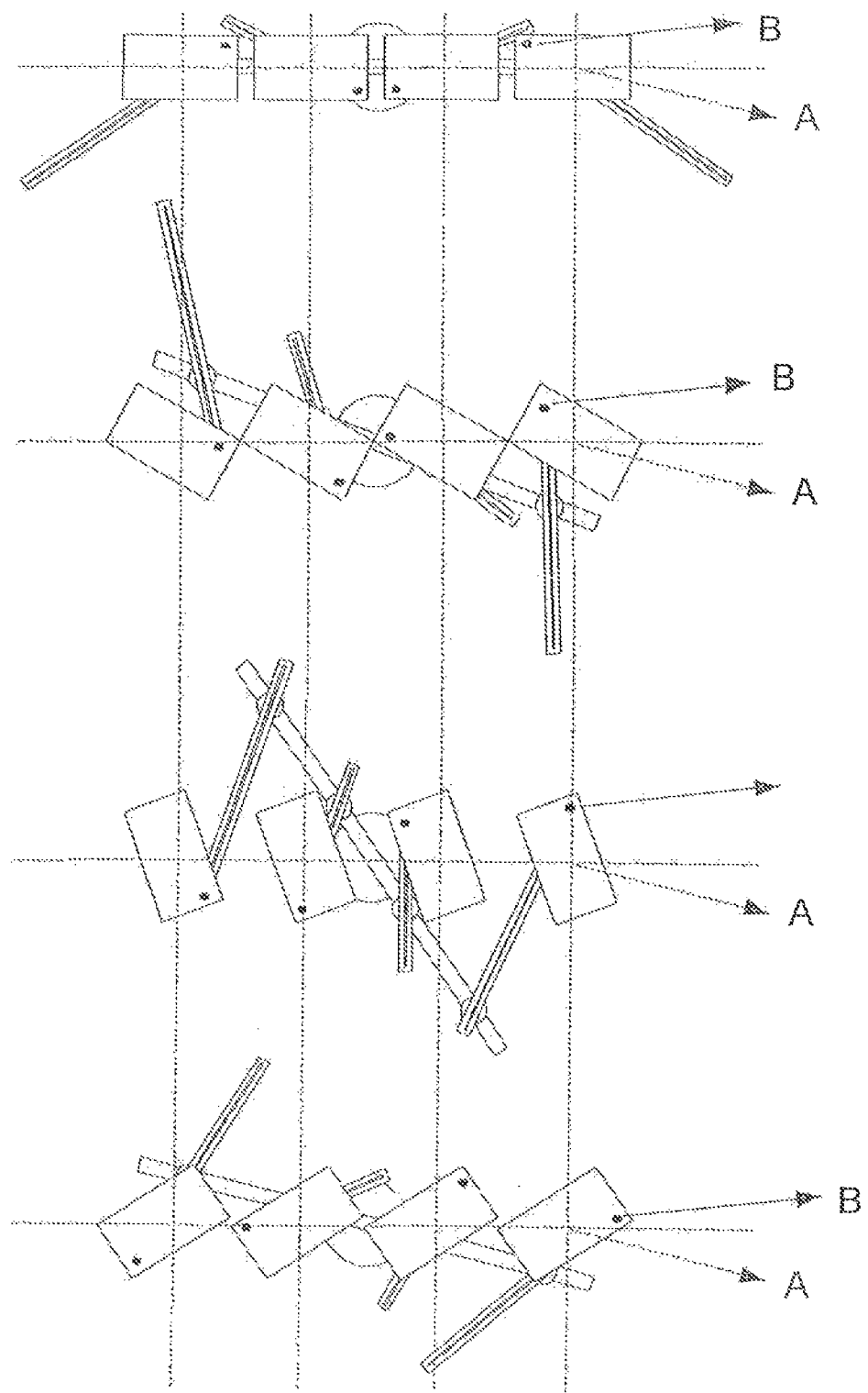
FIG. 7 depicts the screens of the three degree-of-freedom parallel manipulator rotating about their geometric centres.

Referring to FIG. 7, this configuration allows for the appearance of the screens to be rotating about their geometric centres (point A), even though they are, in fact, actuated at their corners (point B).

Figure 8:
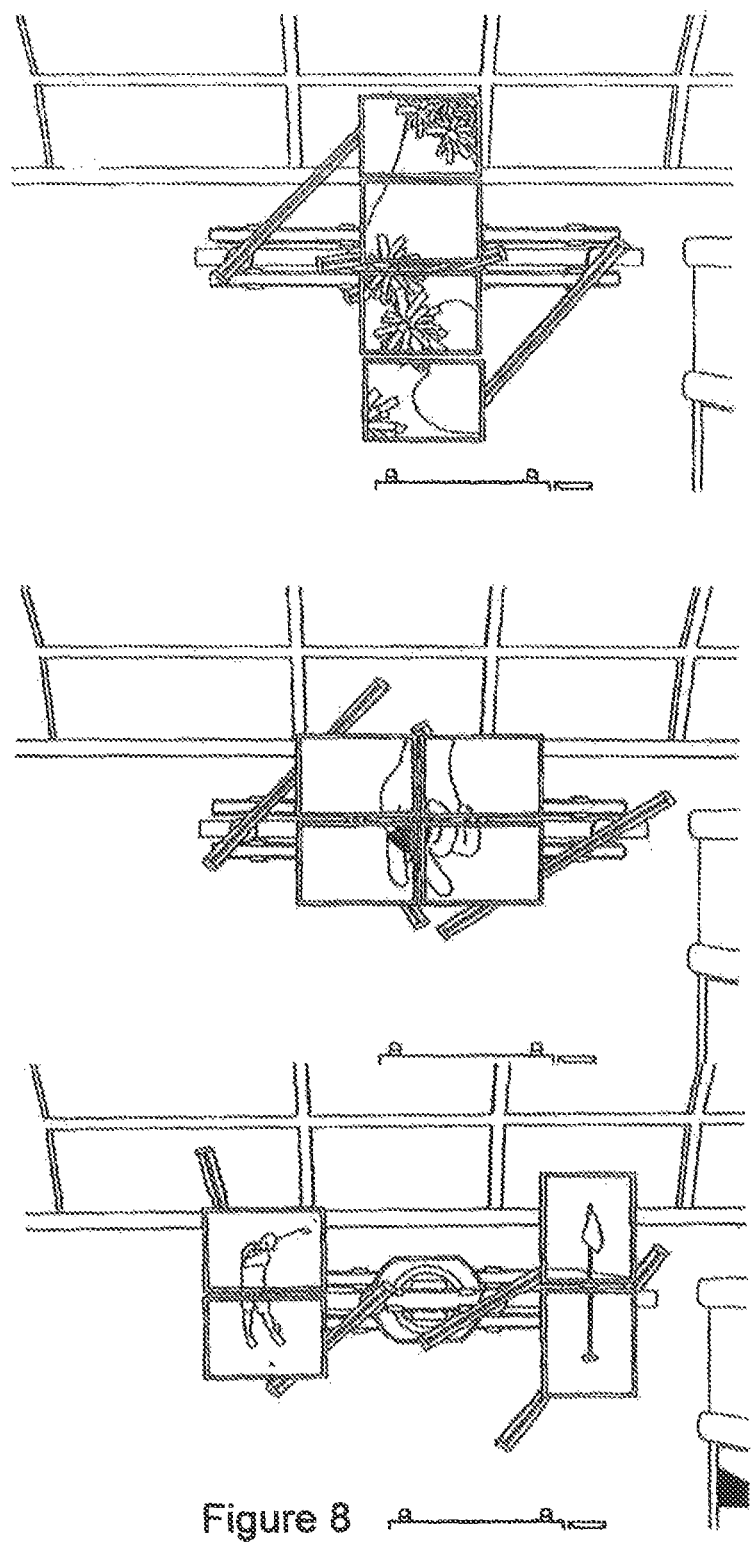
FIG. 8 is the first 3 in a collection of 6 screen shots of the three degree-of-freedom parallel manipulator being used in a golf commercial storyboard.
Figure 9:
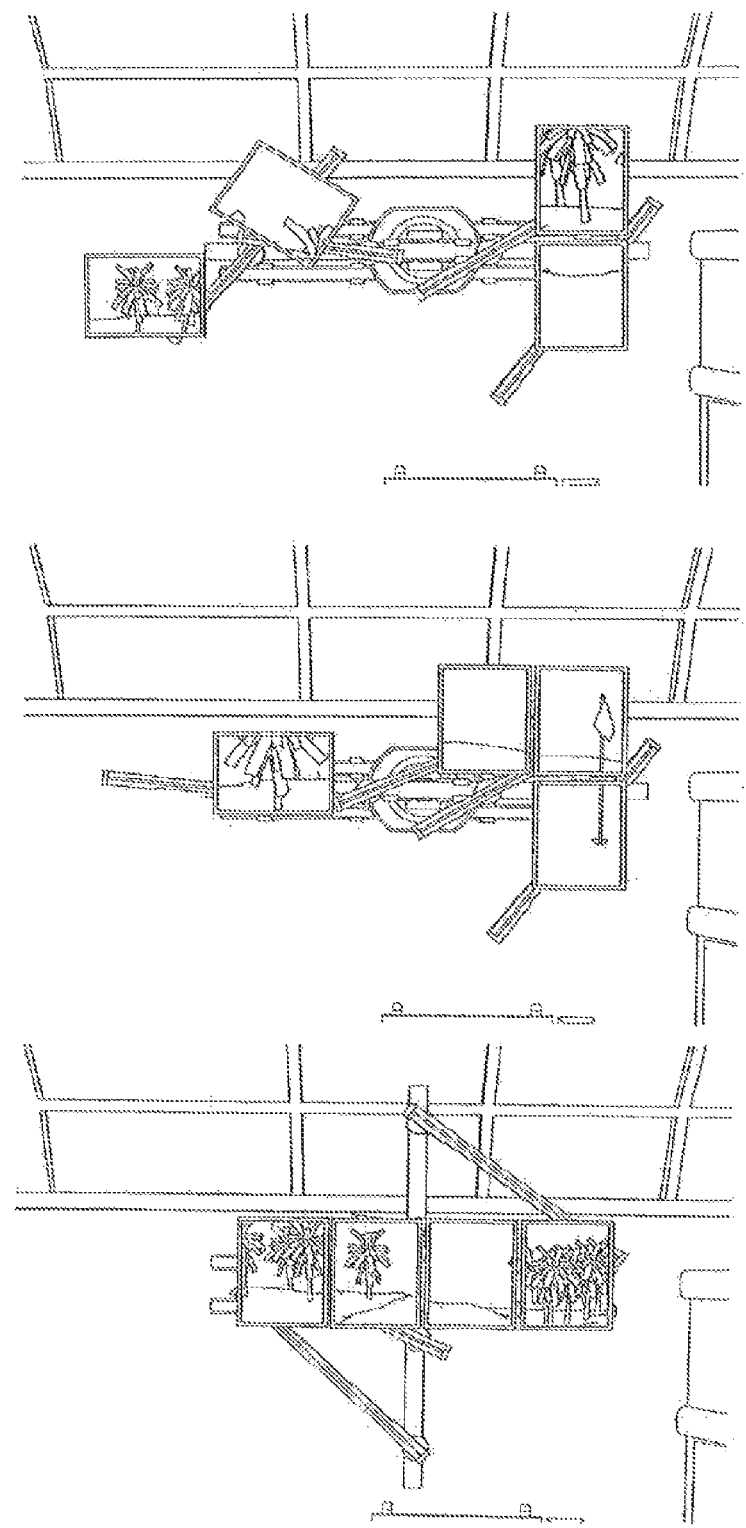
FIG. 9 is the second 3 in a collection of 6 screen shots of the three degree-of-freedom parallel manipulator being used in a golf commercial storyboard.

An example of an application of the three degree-of-freedom parallel manipulator can be seen in FIGS. 8 and 9. These are screenshots of a golf advertisement depicting the contribution of the screens throughout the video. As seen in the figures, the screens can be employed to introduce the scene by showing a fly-over view of the golf course. Then, 2 screens are used to show the golfer hitting the ball, while the other 2 screens stay fixed onto the flag, giving the viewer a sense of the breadth of the scene. As the ball soars through the air, a screen tracks its trajectory, until the ball 'drops onto' the final 2 screens, rolling into the hole. The motion of the screens adds another dimension to the video graphics content, keeping the audience interested and engaged to the demonstration.

Figure 10:
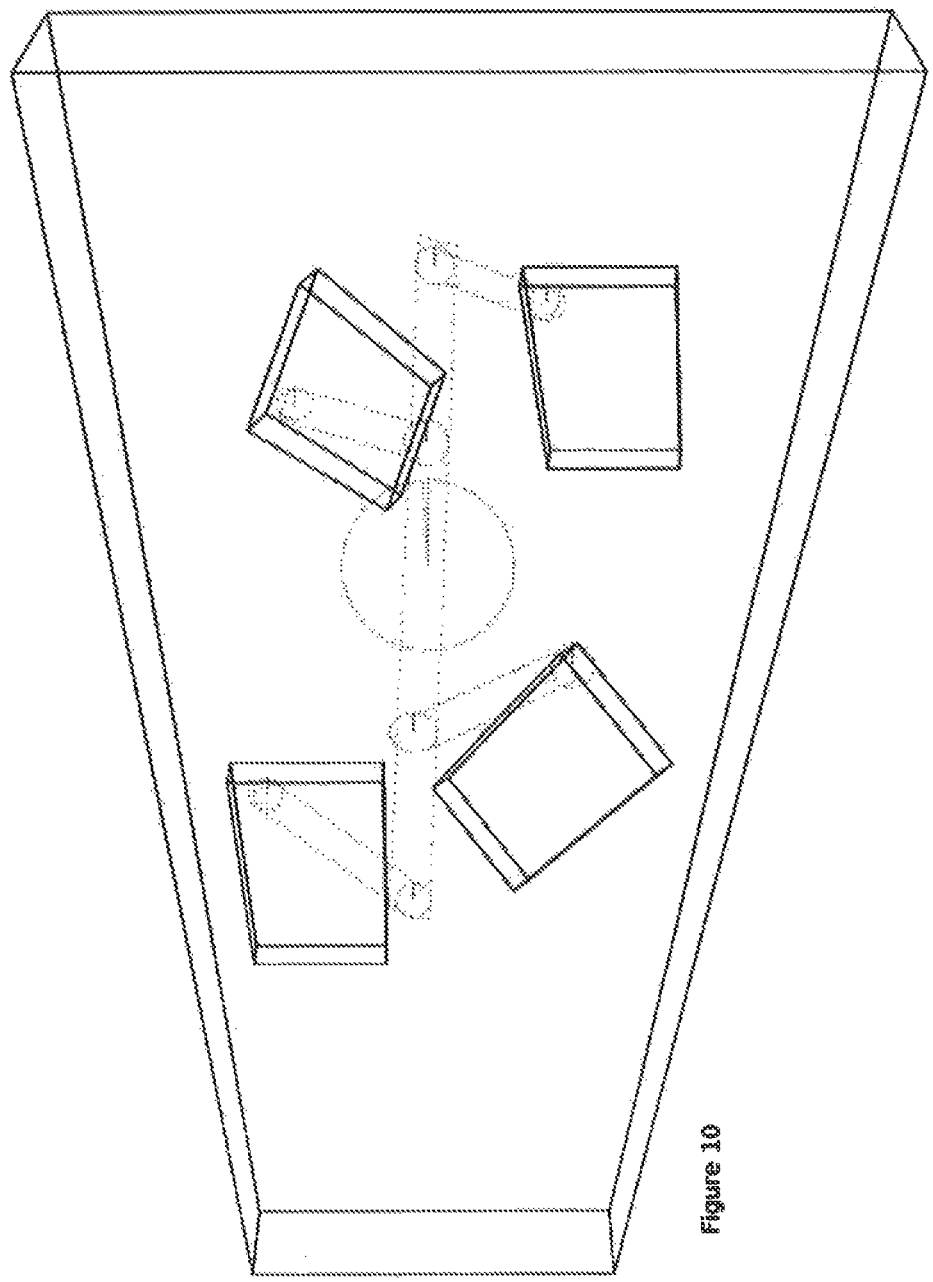
FIG. 10 depicts the screens of the three degree-of-freedom parallel manipulator travelling on a large polymer surface, with the remaining mechanical components behind the surface.

Planar systems may also be configured to completely hide their manipulator structure by suspending a large low-friction polymer surface panel between the screens and the manipulator mechanics. Ends of each manipulator and the backs of the screens would be affixed with low-friction, polymer-encased, attracting magnets so that although each screen would magnetically track the motion of its corresponding manipulator behind the large polymer surface, viewers would simply see the screens floating in front of such a surface (FIG. 10). Although points where the polymer panel is suspended cannot be traversed, through artistic choreography, viewers will believe that there is unlimited motion. Inductive coils transfer energy to power the screens, or the screens can include rechargeable batteries which charge when the screens move into 'docking stations' with charging contacts located towards the outsides of the polymer panel. Data can either be transferred using inductive coils or traditional wireless data protocols. A further aspect of this design is that in harsh climates, protecting the manipulators from salt, water, debris, and other forms of wear and corrosion can significantly lengthen the life of the now-enclosed robotic mechanisms. The screens themselves could also be moved up, under, or into overhanging shelters in times of inclement weather if the rear apparatus was mounted on a track enabling appropriate motion.

Figure 11:
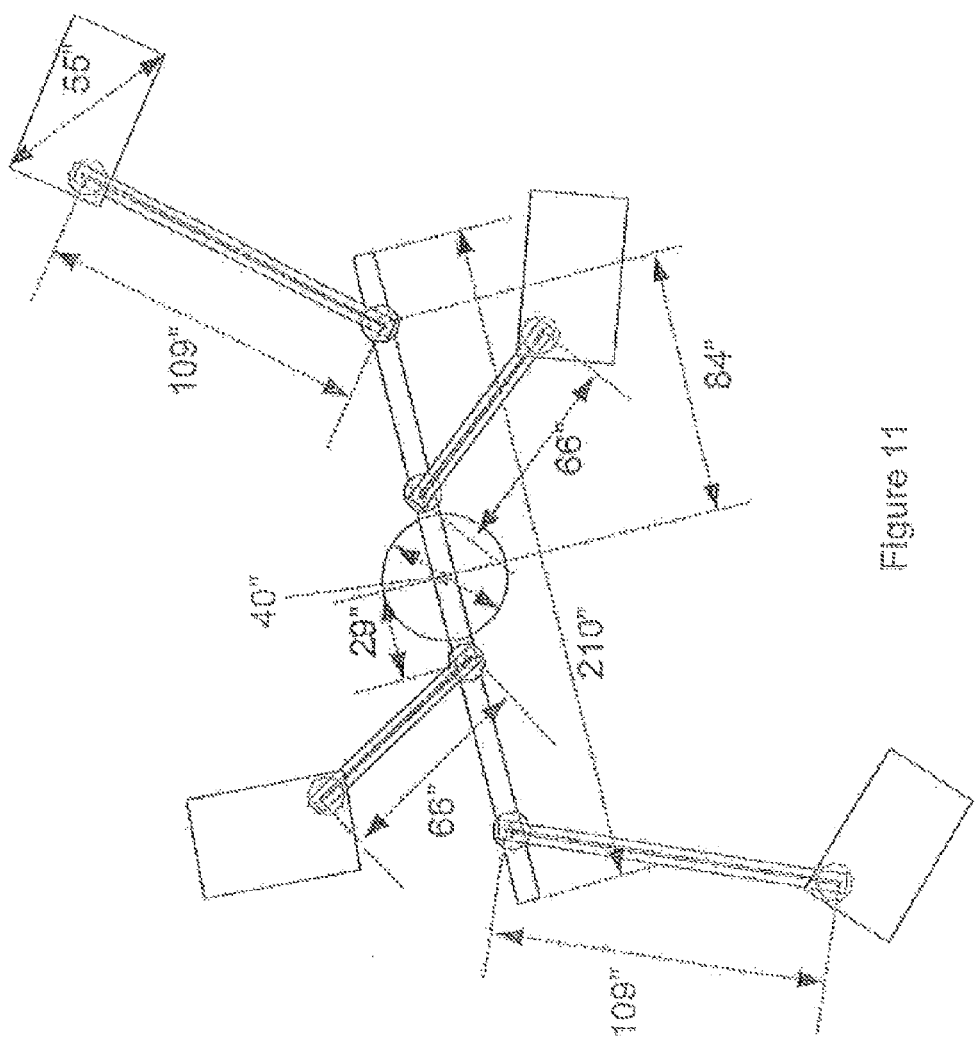
FIG. 11 outlines measurements of the three degree-of-freedom parallel manipulator.
Figure 12:
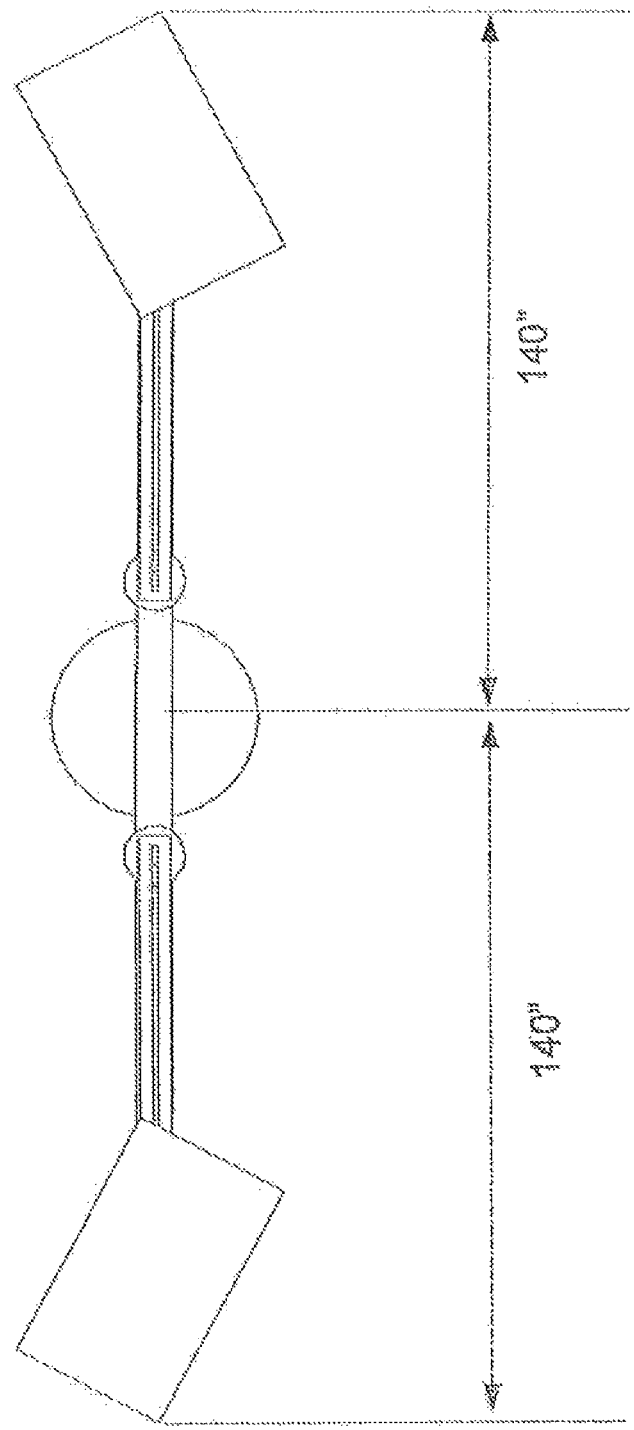
FIG. 12 shows the limits of the inner arms of the three degree-of-freedom parallel manipulator.
Figure 13:
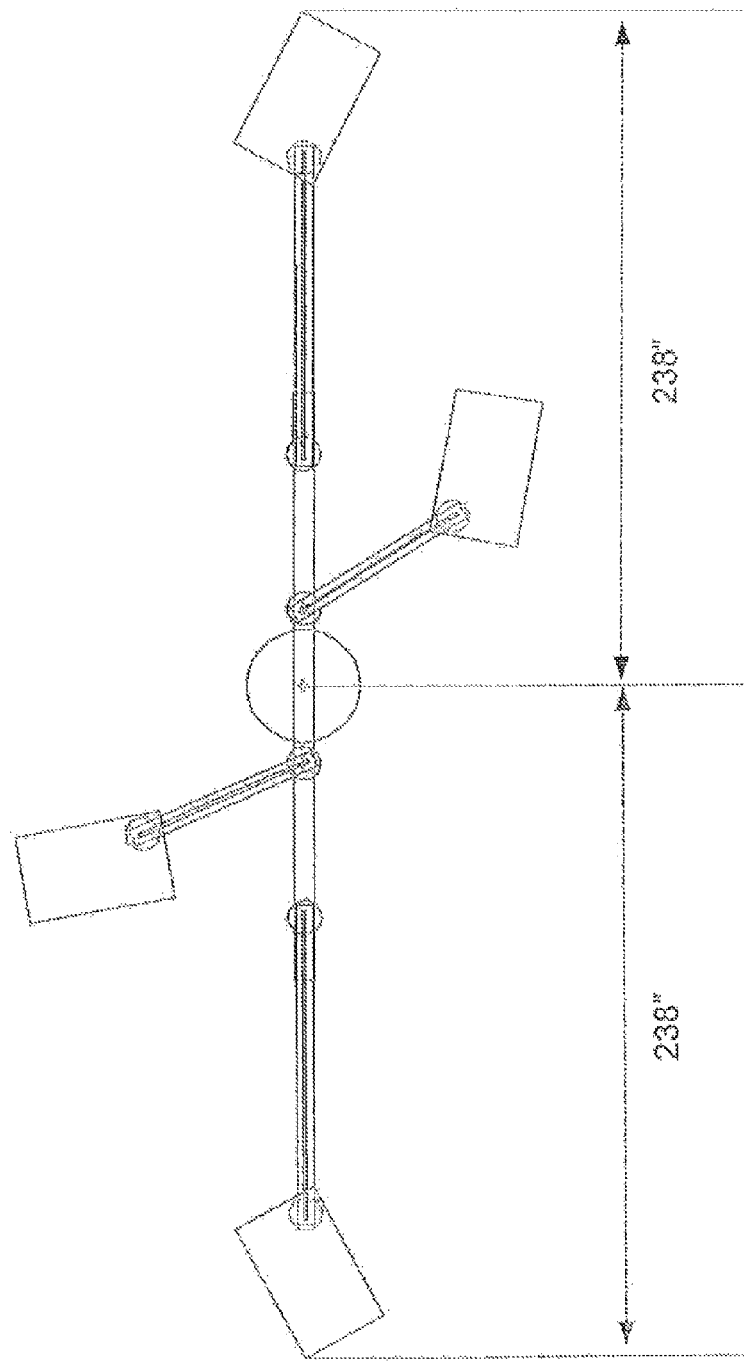
FIG. 13 shows the limits of the outer arms of the three degree-of-freedom parallel manipulator.
Figure 16:
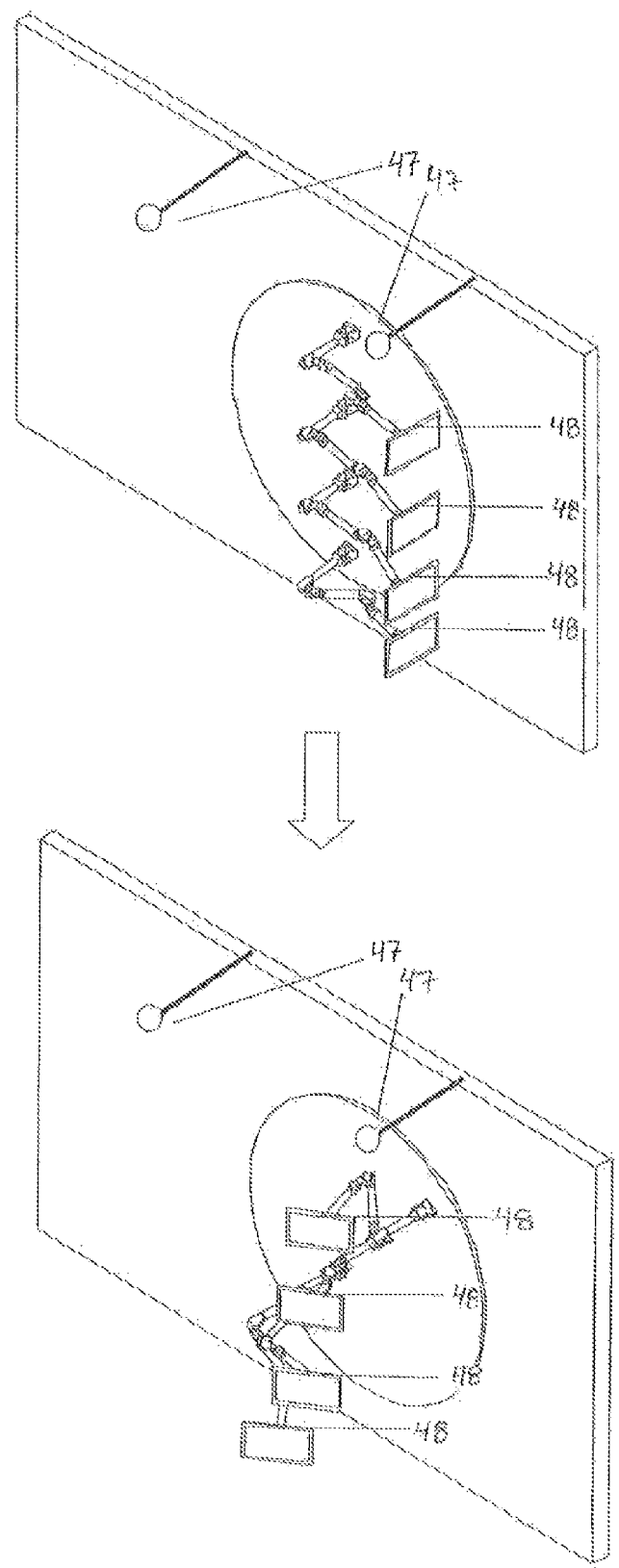
FIG. 16 depicts the ability of the six-degree-of-freedom robotic arm manipulator to follow/track a viewer loosely.
Figure 17:
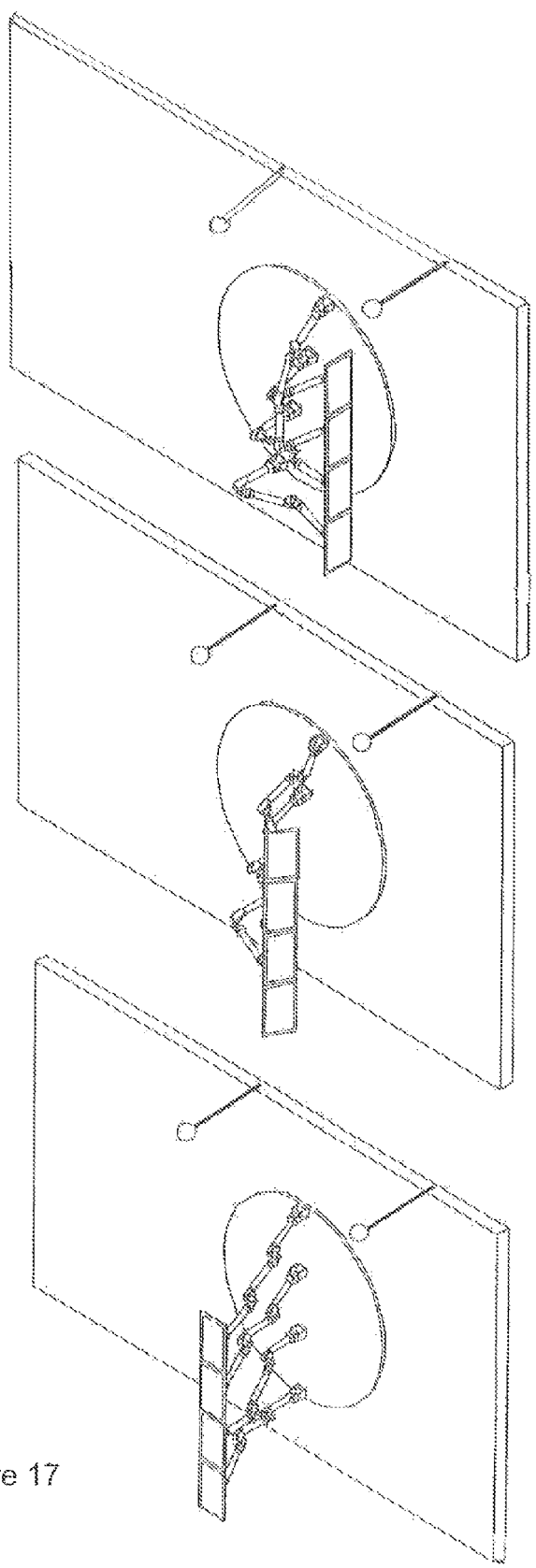
FIG. 17 depicts the ability of the six-degree-of-freedom robotic arm manipulator to follow/track a viewer with greater accuracy.
Figures 18, 19A, 19B, 19C, 19D:
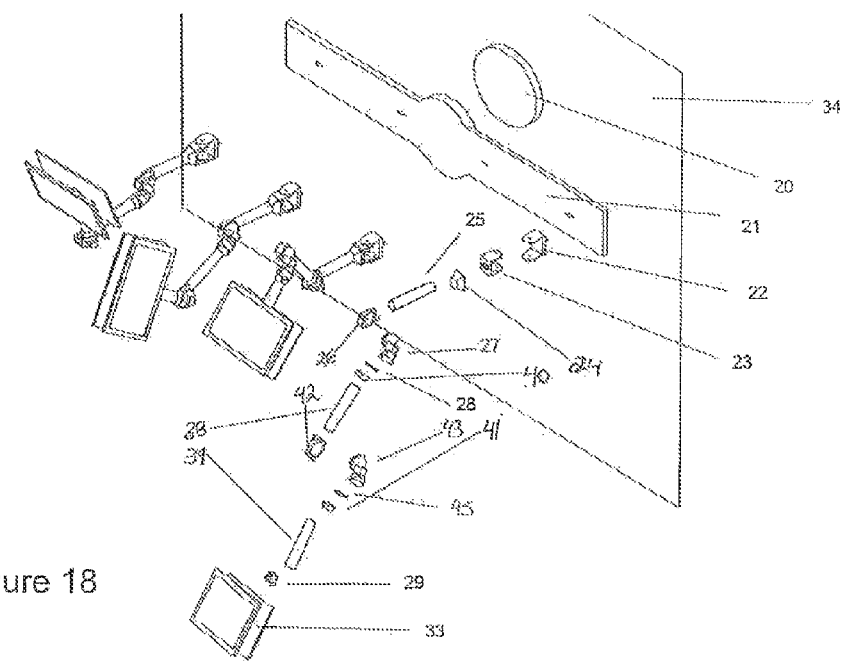
FIG. 18 is an exploded view of the six degree-of-freedom robotic arm manipulator with dual-screens.
FIG. 19A-D are sets of orthogonal views of the six degree-of-freedom robotic arm manipulator with dual-screens including A) a front view, B) a side view, C) a top view and D) a perspective view.

Another key feature of this robot is its high screen area to workspace area ratio. Screen area is defined as the total usable area of the screens; for 55" screens, the screen area is approx. 6,532 inch$^2$. The workspace area is defined as the total usable area by the robot. Using the dimensions from FIG. 11-13 the workspace area is calculated to be 482,686 inch$^2$. Thus, the screen to workspace area ratio is 1:73. With this arrangement the workspace area is very large relative to the total screen area. Even with a ratio of 1:10 an improved system is realized.

The six degree-of-freedom robotic arm manipulator (as seen in FIG. 14 and FIG. 15A-D) provides the most diverse 3D advertising/displaying experience of the systems presented in that the arms provide maneuverability that none of the previously mentioned systems can. A high-torque rotary (pancake) motor 20 is mounted directly to the wall, ceiling or another support structure, depending on the application of the system. A mounting plate 21 is attached to the rotary part of the high torque rotary motor 20. This mounting plate 21 provides a base to which one or more 3D robotic arms can be mounted. The preferred number of arms is 4. Unlike the 3 degree of freedom manipulator, each arm in the 6 degree of freedom manipulator is the same.

A 3D robotic arm 55 is attached to the mounting plate 21 by a shoulder socket 22. The shoulder joint 23 attaches to the shoulder socket and the rotation between the shoulder socket and joint can either be fixed or controlled by a motor or gear. The arm support 24 attaches to the shoulder joint 23, either directly or through a motor, thus allowing axial rotation of the first arm member 25 which connects to the arm support 24. A rotary socket 26 is attached to a rotary joint 27 which is essentially a rotary motor with housing attached to it to facilitate connection to the rotary socket 26 and a spacer 28. This spacer is then connected to a second arm support 40, to which the second arm member 38 is fixed. It is possible to connect a rotary motor between the space and the arm support to allow axial rotation of the second arm member, therefore is possible for the second arm member to rotate axially as well as in the vertical plane. A second rotary socket 42 is fixed to the distal end of second arm member 38. The second rotary socket 42 is connected to a third arm support 41 via a second rotary joint 43. Once again this linkage could be modified to allow for controlled axial rotation of the third arm member 39, which is connected to the spacer 45 and then to third arm support 41. The distal end of the third arm member 39 has a wrist socket 29 attached to it, which facilitates connection to the wrist joint 30. The wrist joint 30 is connected to rotary support 31. The rotary support 31 is attached to rotary motor (not shown) which is mounted directly on the television screen 32.

The arrangement of the six degree-of-freedom robotic-arm manipulator can be adopted to include dual-screens (as seen in FIG. 18 and FIG. 19A-D). This arrangement is very similar to the 6 degree of freedom manipulator previously described. All parts are identical to those in the single screen design and the part numbers have been kept constant in the figures. There is a difference in the linkage structure distal to the wrist socket 29. A wrist joint 30 attaches directly to the wrist socket 29 on one end and to 2 television screens, arranged back-to-back, on the other end. This results in the reduction of the last rotational degree of freedom in the previously described model, but enables designers to use the dual-screen setup in creative ways. The entire system can be installed on top of a reflective backdrop 34, which allows the designers to use this reflective surface in creative ways. Backdrops could include fog/mist walls, waterfalls, and smoke walls.

Figure 20:
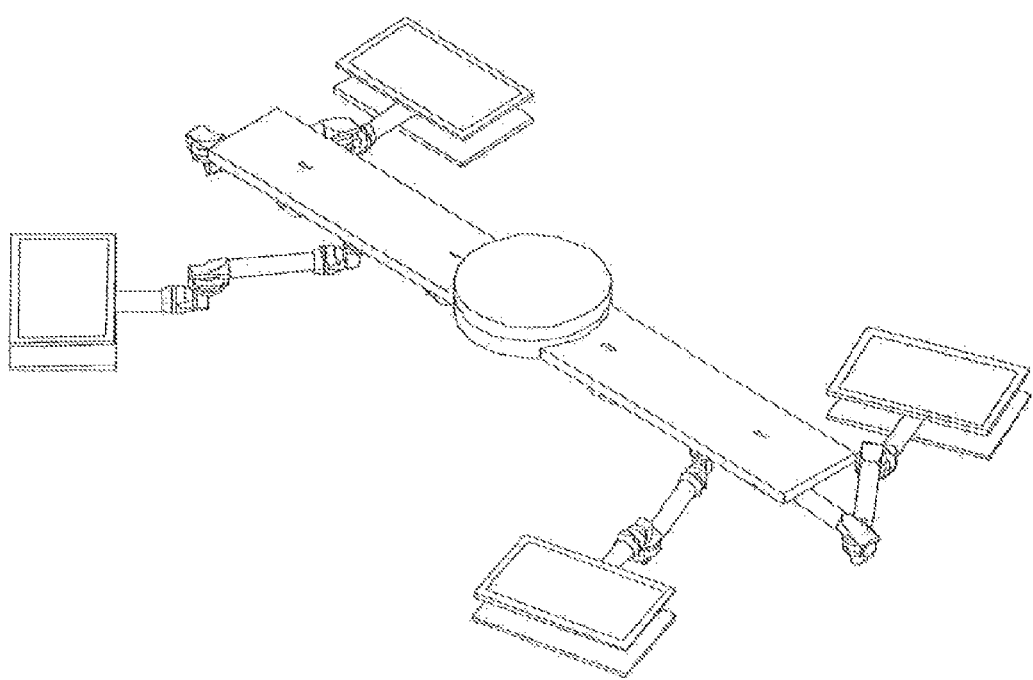
FIG. 20 is a diagram of the six degree-of-freedom robotic arm manipulator mounted onto the ceiling.

One use for the six degree-of-freedom robotic-arm manipulator with dual-screen heads is exemplified in FIG. 20, where the robot is mounted onto a ceiling such that the upper-facing display can project patterns onto the ceiling—creating an ever-changing halo for various moods and effects. Note that it is also possible to place digital projectors on the rear of such dual-display heads which may also be coupled with 30-degree servomotors to rock such heads 15 degrees to the left and right. In a further implementation, such dual-screen systems can be mounted on a cross-bar in front of (in the case of wall-mounting), or below (in the case of ceiling mounting) a mirrored surface. Such surface may be one mirror or a tiled pattern of many mirrors (concave, flat, convex, spherical, or any combination thereof). By projecting images onto this surface in conjunction with the choreography, an entire room can be filled with moving projections.

It is possible to adapt any of the three robotic displays described above to include choreography which stacks the displays perpendicular to the mounted wall to first attract the attention of side viewers, and then follow such viewers as they move around the robotic display system. This can be accomplished by the addition of one or more stereo cameras 47 and/or one or more smaller screen cameras 48 mounted directly onto each of the screens. This setup allows for creative and realistic interaction of the system with people. Such a system could be designed so that as people walk by the mechanism, the stereo cameras 47 can pinpoint the exact location of an individual within the vicinity of the robot, allowing the screens to interact with the individual. The screen cameras 48 could be used to capture details about the individual, which can then be manipulated by intelligent image-processing software to pick out specific details about the individual (hat colour, hair length, type of clothing, etc.) in order to provide a more realistic interaction with the robot. Furthermore, the cameras can be used to show the other individuals in the area, exactly what the robot "sees" on a larger screen set up to the side of the choreography or as a dynamic part of the choreography itself.

With many of the embodiments already described, it is possible to accommodate partial overlap of screens if desired. This allows partial reduction of the viewing area and expansion thereof as the extent of overlap is reduced. This arrangement provides a number of advantages including visual opportunities for more realistic depiction of colliding objects or near miss of objects.

As can be appreciated, the individual display screens can be very large commercial display screens, although smaller screens can also be used for other applications.

Software Component

A choreographed presentation involves integration of several elements: motion, visual-content render, sound and lighting effects, and time. Referred to as an MVST (Motion, Visual render, Sound/lighting and Time) display system, it defines a new media paradigm.

The MVST-display systems consist of screens that are driven by robotic arms with two or more degree-of-freedom, controlled by a set of connected motors. The motion for the displays is expressed as a series of MVST events, described shortly. Creating a presentation in the Creative Designer's Workbench Application (CDWA) is a revolutionary experience, unlike anything seen before. Essentially, designers create MVST events, which are critical points in time during the choreography where the screens, content on the screens, music, and lighting all precisely line-up as required.

MVST Events

The content on the screens can be shared between multiple screens, or there can be individual content that targets one or more screens. Thus, all of the screens can be playing back a single video or looking at a single image so that the screens are windows into a large virtual area. The content can also be anchored to a screen or it can follow a custom path. For each MVST event in the motion path, a new video can begin playing, or a new image can be displayed. The location of the video or image can be relative to the background, relative to one of the screens, or can be specified as a zoom and rotation relative to the centre of the robot.

Designers are required to create a minimum number of MVST events for their presentations, essentially outlining key points in the motion, such as abrupt stops, cusp motions, etc. The CDWA then interpolates and creates motion plans between MVST events, saving the designer the work of having to create the entire motion plan manually. This interpolation process takes into account the model of the specific MVST display being used and creates the optimal motion plan keeping motor acceleration limits and heat profiles in mind. The benefit of this is that the CDWA creates a motion plan that is specific to the current hardware, using the generic MVST events outlined by the designer.

As an example, consider the following scenario. A designer is working on an advertisement involving a large-scale MVST display with 4 screens; this display will be installed in a large space such as an airport, or a shopping mall. The advertisement involves all 4 screens starting off together in a square pattern, then breaking away diagonally while all of the screens are spinning, and finally coming back to end in a square pattern. The designer uses the CDWA to create critical MVST events for the advertisement and the CDWA creates the motion paths between the MVST events for the large-scale MVST display being used. Now, consider a small-scale MVST display installed at a retail store-front. The designer can run the same presentation on the smaller MVST display without having to change the presentation. The MVST events are still the same, except now the CDWA interpolates a motion path for the smaller MVST display. As long as the smaller system is capable of performing the required motions, the presentation will be similar to the one seen on the large-scale system.

MVST Model File

Figure 21:
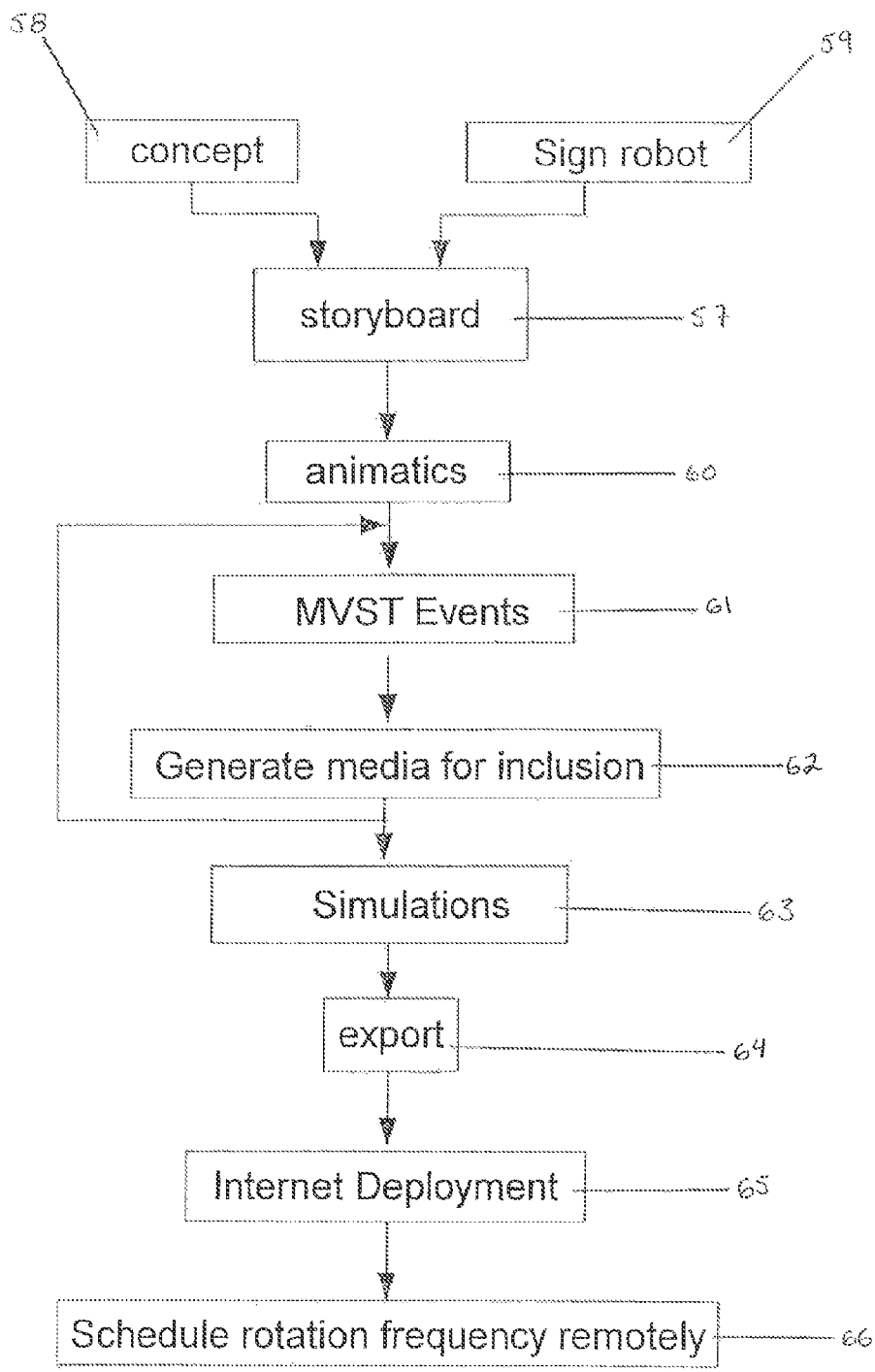
FIG. 21 is a flowchart of the content creation process.

Creating a presentation requires several steps (FIG. 21). Initially, the designer needs a model of the MVST display to be used (acquired externally). This is shown as "Sign robot" 59. This model file includes all of the following necessary parameters (and their units) to completely characterize the MVST system:

Denavit-Hartenberg (D-H) variables
  link offset, d (m)
  link length, a (m)
  twist angle, $\alpha$ (rad)
  joint angle, $\theta$ (rad)
link masses (kg)
link centres of gravity (coordinates)
link envelopes
motor locations (coordinates)
motor limits
  peak torques (Nm)
  rated speeds (m/s, rad/s)
  peak Force (N)
  stroke (m)
  thermal resistivity (deg. C./Watt)
  rated voltage (V)
  rated current (A)

Figure 22A:
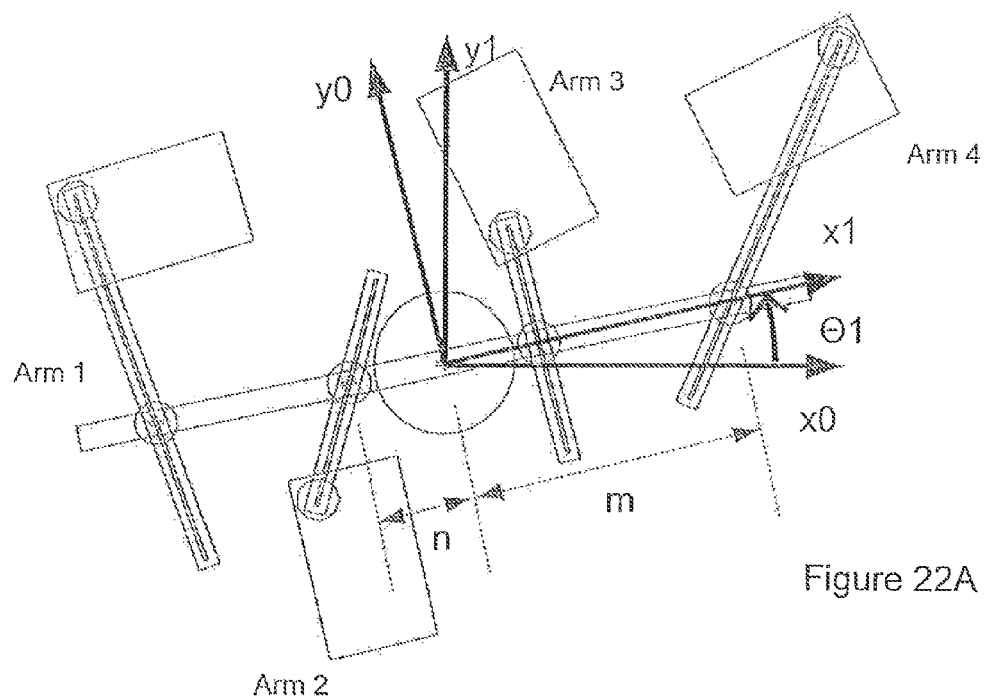
FIG. 22A-B depict an example planar robot and its assigned coordinate frames for the D-H analysis.
Figure 22B:
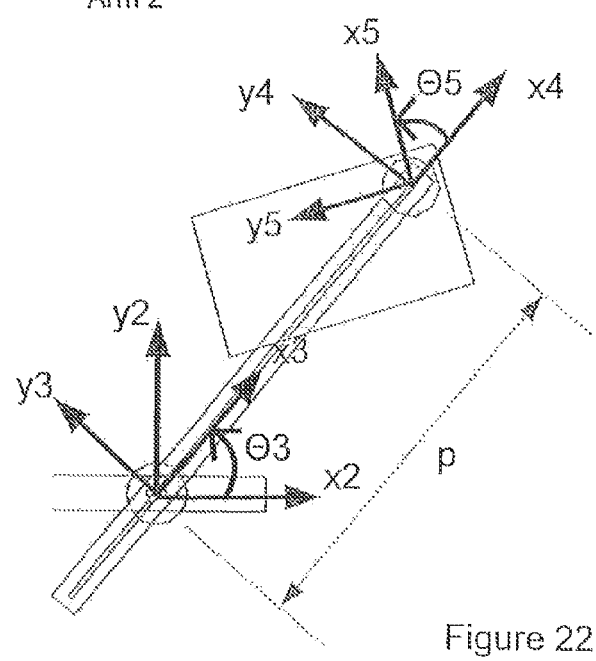

The four D-H variables are required to completely characterize the forward-kinematics formulation of the MVST display. Treating the MVST display as a set of links and actuation points, one can easily determine the position and orientation of the end-effector (the screens in this case) based on the link lengths and the angles between consecutive links. The D-H characterization is not unique and one must make sure to account for all the degrees-of-freedom of the robot. Table 1 is an example D-H table for one of the arms of the 4-screen planar robot. FIGS. 22A and B show the planar arm and its coordinate-frame assignments.

TABLE 1

D-H parameters for one manipulator of the planar robot

| Joint | $\alpha$ | $\Theta$ | d | a |
|---|---|---|---|---|
| 1 | 0 | $\Theta1$ | 0 | 0 |
| 2 | 0 | 0 | 0 | m |
| 3 | 0 | $\Theta3$ | 0 | 0 |
| 4 | 0 | 0 | 0 | p |
| 5 | 0 | $\Theta5$ | 0 | 0 |

These parameters are then used in homogenous transformation matrices, in order to solve the forward kinematics problem for each specific arm. The planar robot is a combination of four such arms. In order to solve the forward kinematics problem for the entire robot, a D-H table for each arm is needed. Since each arm has a fixed reference frame at the centre of the planar robot (x0-y0 frame), a table with all the D-H parameters for the entire robot, Table 2, can be created.

TABLE 2

D-H parameters for planar robot

|  | $\alpha$ | $\Theta$ | d | a |
|---|---|---|---|---|
| Arm 1 Joint |  |  |  |  |
| 1 | 0 | $\Theta1$ | 0 | 0 |
| 2 | 0 | 0 | 0 | m |
| 3 | 0 | $\Theta3$ | 0 | 0 |
| 4 | 0 | 0 | 0 | p |
| 5 | 0 | $\Theta5$ | 0 | 0 |
| Arm 2 Joint |  |  |  |  |
| 1 | 0 | $\Theta1$ | 0 | 0 |
| 2 | 0 | 0 | 0 | n |
| 3 | 0 | $\Theta3$ | 0 | 0 |

TABLE 2-continued

D-H parameters for planar robot

|   | α | Θ | d | a |
|---|---|---|---|---|
| 4 | 0 | 0 | 0 | p |
| 5 | 0 | Θ5 | 0 | 0 |
| Arm 3 Joint | | | | |
| 1 | 0 | Θ1 | 0 | 0 |
| 2 | 0 | 0 | 0 | n |
| 3 | 0 | Θ3 | 0 | 0 |
| 4 | 0 | 0 | 0 | P |
| 5 | 0 | Θ5 | 0 | 0 |
| Arm 4 Joint | | | | |
| 1 | 0 | Θ1 | 0 | 0 |
| 2 | 0 | 0 | 0 | N |
| 3 | 0 | Θ3 | 0 | 0 |
| 4 | 0 | 0 | 0 | p |
| 5 | 0 | Θ5 | 0 | 0 |

Figure 23:
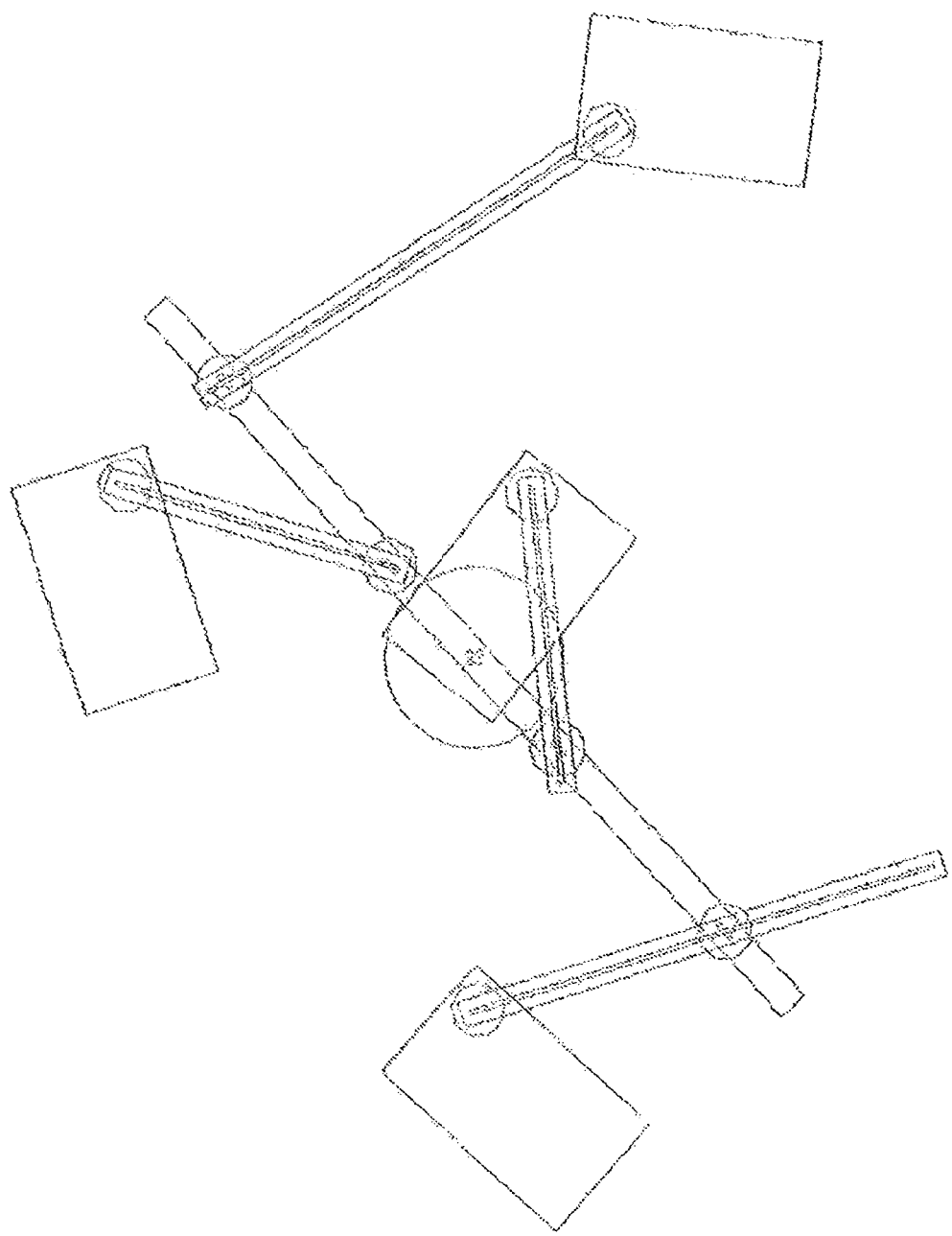
FIG. 23 depicts the orientation of a planar robot used as a numeric example for the D-H analysis.

This table gives information about the joints in each arm as well as the position of the base of each with respect to the fixed centre of the robot, which is enough to fully solve the forward kinematics problem for the robot with the help of the homogeneous transformation matrices. Table 3 provides an example of the D-H parameters for a specific orientation of the planar robot in FIG. 23.

TABLE 3

Example D-H parameters for planar robot

|   | α | Θ | d | a |
|---|---|---|---|---|
| Arm 1 Joint | | | | |
| 1 | 0 | 43° | 0 | 0 |
| 2 | 0 | 0 | 0 | −84" |
| 3 | 0 | 64° | 0 | 0 |
| 4 | 0 | 0 | 0 | 54" |
| 5 | 0 | 21° | 0 | 0 |
| Arm 2 Joint | | | | |
| 1 | 0 | 43° | 0 | 0 |
| 2 | 0 | 0 | 0 | −29" |
| 3 | 0 | −37° | 0 | 0 |
| 4 | 0 | 0 | 0 | 60" |
| 5 | 0 | 44° | 0 | 0 |
| Arm 3 Joint | | | | |
| 1 | 0 | 43° | 0 | 0 |
| 2 | 0 | 0 | 0 | 29" |
| 3 | 0 | 31° | 0 | 0 |
| 4 | 0 | 0 | 0 | 32" |
| 5 | 0 | 5° | 0 | 0 |
| Arm 4 Joint | | | | |
| 1 | 0 | 43° | 0 | 0 |
| 2 | 0 | 0 | 0 | 84" |
| 3 | 0 | −100° | 0 | 0 |
| 4 | 0 | 0 | 0 | 105" |
| 5 | 0 | 50° | 0 | 0 |

The link masses and centres of gravity (CGs) are used by the CDWA to calculate the moments acting on the pivot-points, and thus the motors, in order to assess the loads on the motor. The link masses are multiplied by the acceleration due to gravity (9.807 m/s²) to obtain the forces (F) in Newtons (N). The CG is used as the moment-arm for the moment calculation. The moments are calculated using the following vector cross-product:

$$M = F * d$$

where,
M is the calculated moment (Nm),
d is the moment-arm (m),
and F is the force acting at d (N)

The calculated moment can be compared to the rated torque (Nm) of the respective motor to ensure that said motor is capable of driving the load.

Link envelopes are used to assist the CDWA in 'visualizing' the links of the MVST display. For example, stating the mass, CG, and length of a link are not sufficient because the shape of the link is not entirely categorized by these parameters. The link envelope provides this missing information in the form of a set of coordinates, or nodes, and connection relationships of these nodes to other adjacent nodes. These nodes are used as vertices, and the connection relationships as edges, to create a box-like structure that encompasses the link as accurately as possible. This box-envelope is then used by the CDWA for collision checks during the simulation stage.

Peak torques and speeds are used to calculate the power consumption of DC motors using the following relationships:

$$P = w * t \text{(for rotary motors)}$$

where,
P is the power (Watts),
w is the angular velocity (rad/s),
and t is the torque (Nm)

$$P = F * v \text{(for linear motors)}$$

where,
P is the power (Watts),
F is the force (N),
and v is the speed (m/s)

For 3-phase motors, instantaneous power is calculated as follows:

$$P = 3 * V\_phase * I\_phase * \cos(theta)$$

where,
P is the power (Watts),
V_phase is the phase voltage (V),
I_phase is the phase current (A),
and theta is the phase angle (rad)

Additional information such as stroke is provided for linear actuators, so that the CDWA always knows what the limits of the actuator are. In order to calculate the heat produced, the thermal resistivity and power are required.

$$T\_m = TR * P$$

where,
T_m is the motor temperature (deg. C.),
TR is the thermal resistivity (deg. C./Watt),
and P is the power (Watts)

$$T\_total = T\_m + T\_a$$

where,
T_total is the combined temperature (deg. C.),
T_m is the motor temperature (deg. C.),
and H_a is the ambient temperature (deg. C.)

This information is used by the CDWA to calculate heat production during simulations and compare these values with predetermined heat profile curves to ensure the motor is operating in a safe zone.

Presentation Creation Process

Figure 24:
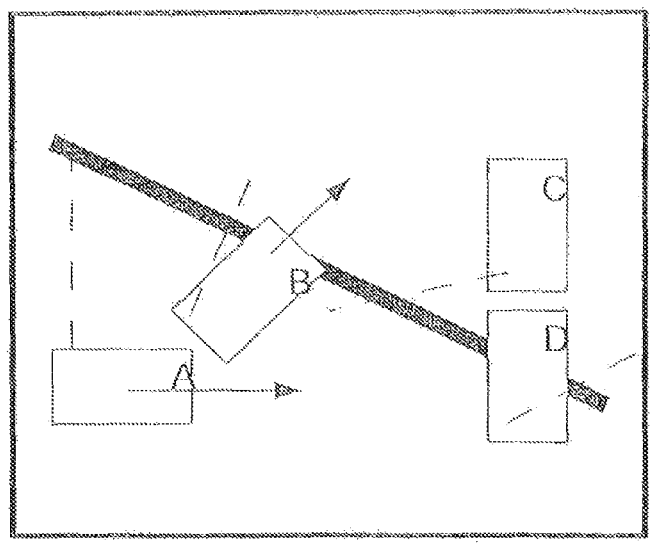
FIG. 24 is a storyboard depiction of screen movement for a planar robot.
Figure 25:
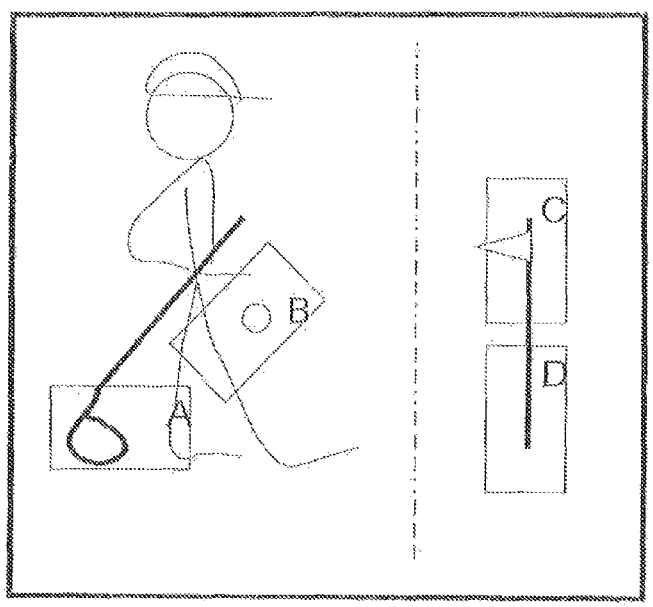
FIG. 25 is a storyboard depiction of screen movement plus the content for the screens.

Referring to FIG. 21, initially, a sequence of illustrations, or storyboard 57, is developed from a concept 58 in order to visualize the presentation. This storyboard is essentially a compilation of the series of events at designated intervals within the overall choreography. FIGS. 24-25 provide examples of storyboarding for a golfing presentation. In FIG. 24, shows a storyboard of just the screen movements, where the arrows indicate the direction of movement of the screens. The screen B will move up and continue to rotate horizontally. FIG. 25 shows both the image content and the screen movement a split screen of a golfer on the left and a pin on the green on the right. Here screen B would follow the golf ball while screen A moves horizontally from showing the golf club to showing the golfers feet. After the storyboard has been completed, the designer moves to the animatics 60 stage. At this stage, more details such as musical backgrounds, camera movements, and test motions of the robotic screens are added to the storyboard. It is anticipated that other lighting effects, produced either by rear-facing projectors or displays, optionally reflecting off back mirror surfaces, or by independent light arrays, will be included in certain choreography designs.

Figure 26:
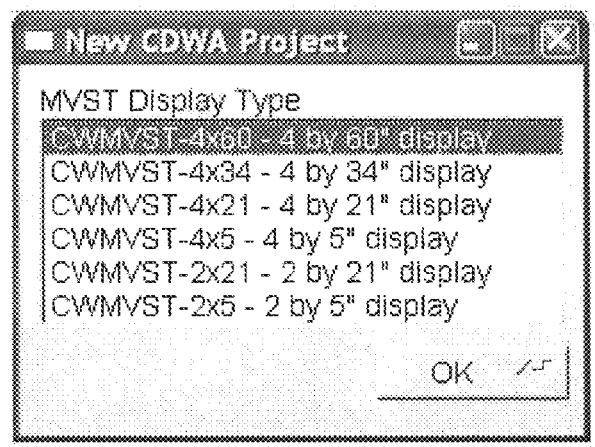
FIG. 26 is a screen shot of the CDWA depicting the new project dialogue box.
Figure 27:
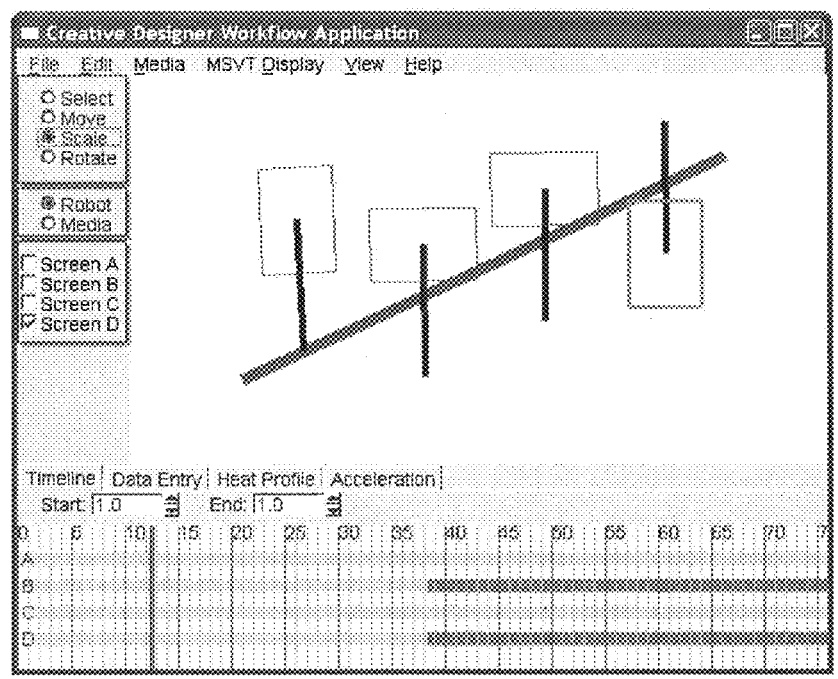
FIG. 27 is a screen shot of the CDWA depicting how the designer manipulates an MVST on-screen.
Figure 28:
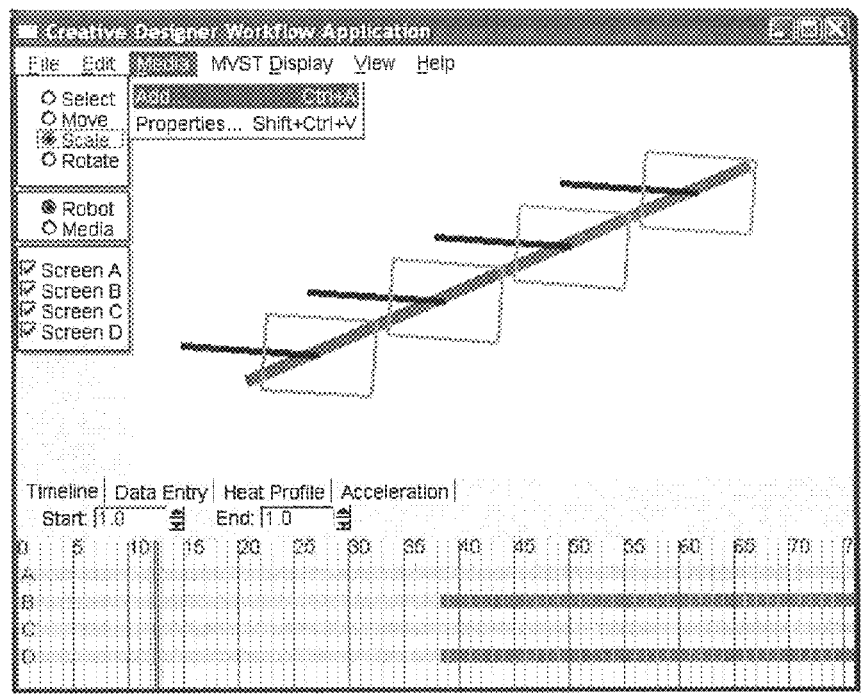
FIG. 28 is a screen shot of the CDWA depicting the insertion of a new media file.
Figure 29:
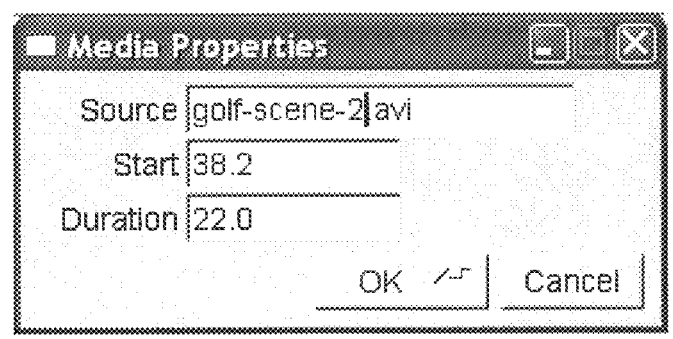
FIG. 29 is a screen shot of the CDWA depicting the designer setting the properties for a newly inserted media file.

Next, the actual MVST events 61 are created. The designer starts by creating a new project in the CDWA. The application allows the designer to choose the type of MVST display to work with, as shown in FIG. 26. After a selection has been made, the CDWA automatically loads the MVST display using the model parameters described above. To begin, the designer moves and orients the MVST display and all of its screens to an initial position. An example starting point is shown in FIG. 27. At this point, the starting time is selected, as well as one or more screens depending on how the presentation will start. A classical piece of media is then imported or linked by using the media menu (refer to FIG. 28), whether it is a picture, animation, video clip, video stream, data feed, or audio track or stream. This is referred to as Generate media for inclusion 62 in FIG. 21. The designer specifies the source of the media file, stream or feed, the start time, and the duration, as exemplified in FIG. 29, as applicable. The first MVST event 61 can be created at the starting point of the presentation.

Figure 30:
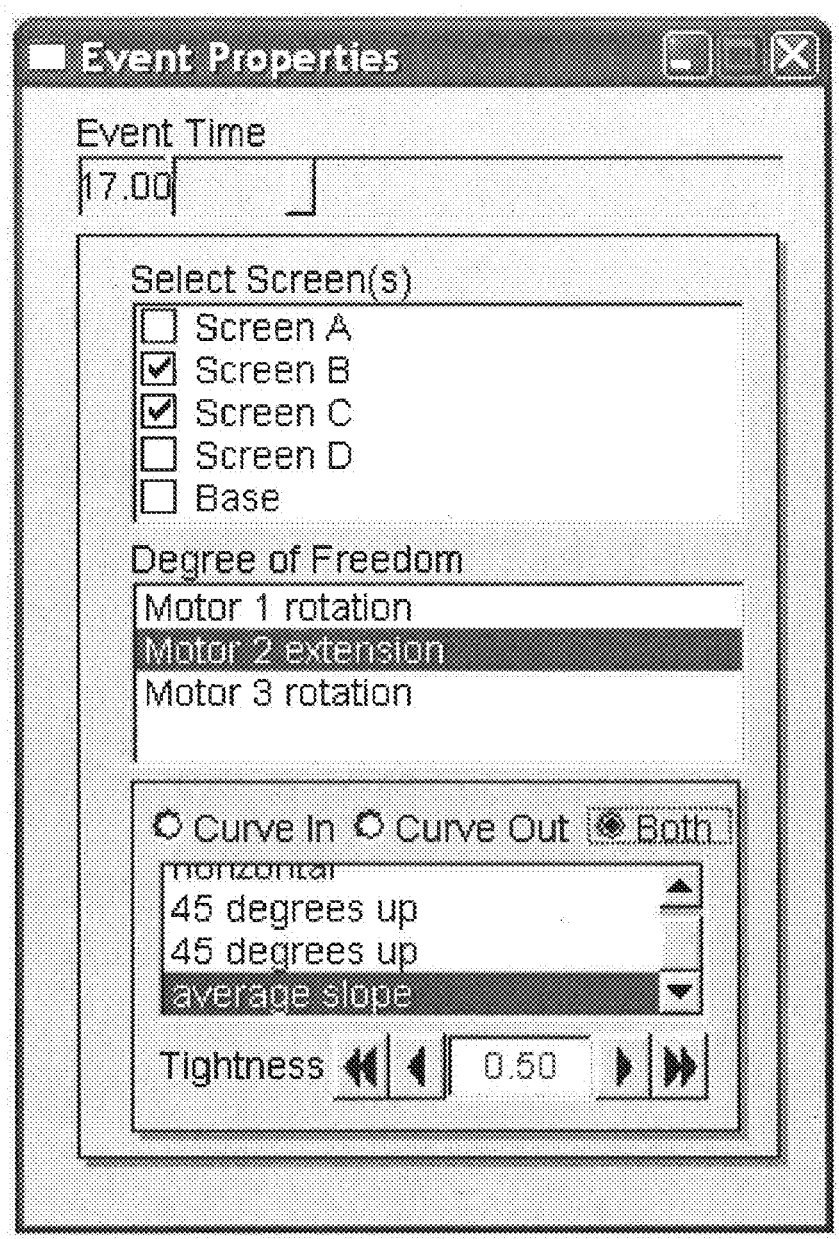
FIG. 30 is a screen shot of the CDWA depicting the designer adjusting the entry/exit points of an MVST event.
Figure 31:
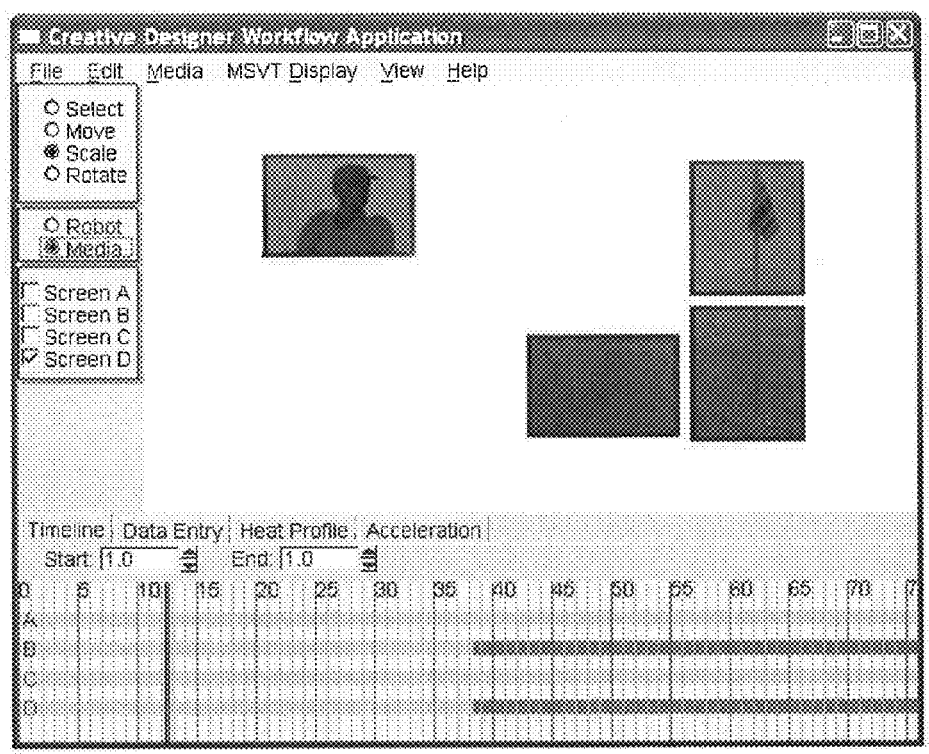
FIG. 31 is a screen shot of the CDWA depicting the working space of the designer.

Subsequent MVST events 61 are created based on important points in the presentation, such as points of high/low acceleration, cusp-motions, shaking-effects, etc. Intricate motions can be described using shape-forming tools such as Bezier curves, linear paths, or high-order splines. Referring to FIG. 30, the designer can use these tools on any motor in the arm assembly as well as to create to synchronize the media for the presentation accordingly. For each MVST event 61, the designer specifies the location and orientation of the screens, as well as the location, orientation, and zoom-level of the content to be rendered on the screens, played through the speakers, or in the case of lighting effects, channeled to light sequencers. All these features can be edited at any time, by selecting the screens or the media and then changing the necessary parameters, an example of which is shown in FIG. 31. As the designer creates more MVST events, the CDWA connects the MVST events 61 with a motion plan based on its own interpolation algorithms. If the designer wants to change the interpolated motion plan, they can change the entry/exit points of the motion at the MVST event 61 in question, using the control points for a Bezier curve for example. The CDWA then produces an updated interpolated motion plan corresponding to these changes.

It is important that designers not add more MVST events 61 than absolutely necessary to achieve the desired choreography if they intend the finished product to run on multiple different hardware configurations. Movement over time between various MVST events 61 is important to enable 'elasticity' so that the choreography can be adapted to differing hardware configurations.

After the completion of all the MVST events 61 and the generation of the motion plans, the designer plays back the presentation to ensure everything is working as desired. This is called Simulations 63 in FIG. 21. If the presentation satisfies the requirements visually and audibly, the presentation is ready to be exported 64.

Figure 32:
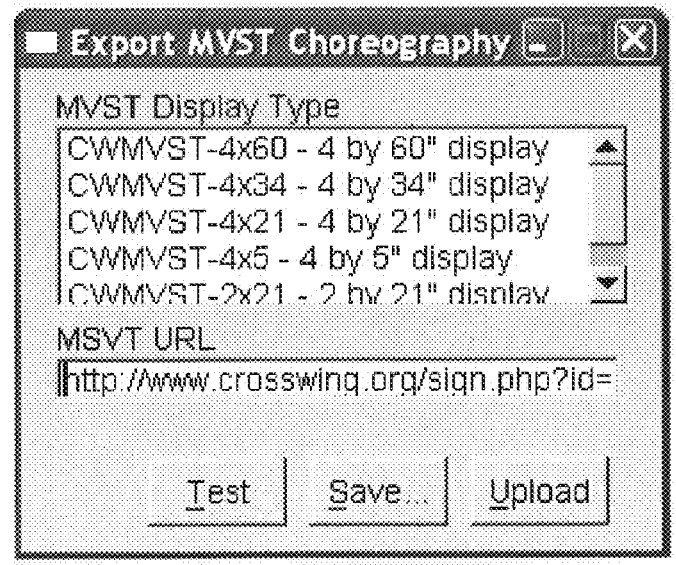
FIG. 32 is a screen shot of the CDWA depicting the export dialogue box.
Figure 33:
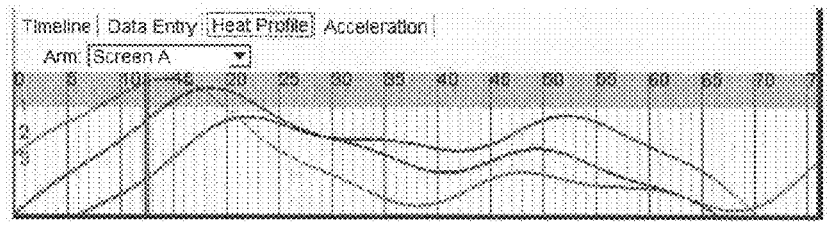
FIG. 33 is a screen shot of the CDWA depicting the generated heat profile for an MVST.
Figure 34:
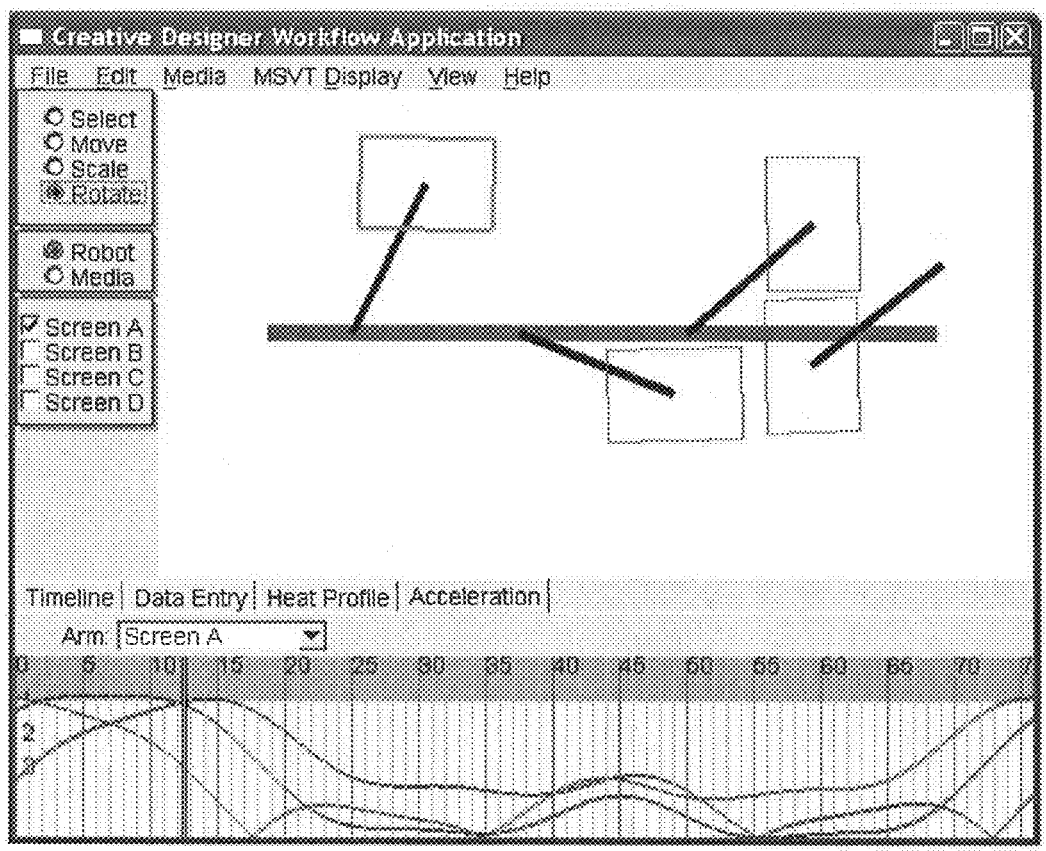
FIG. 34 is a screen shot of the CDWA depicting the generated acceleration profile for an MVST
Figure 35:
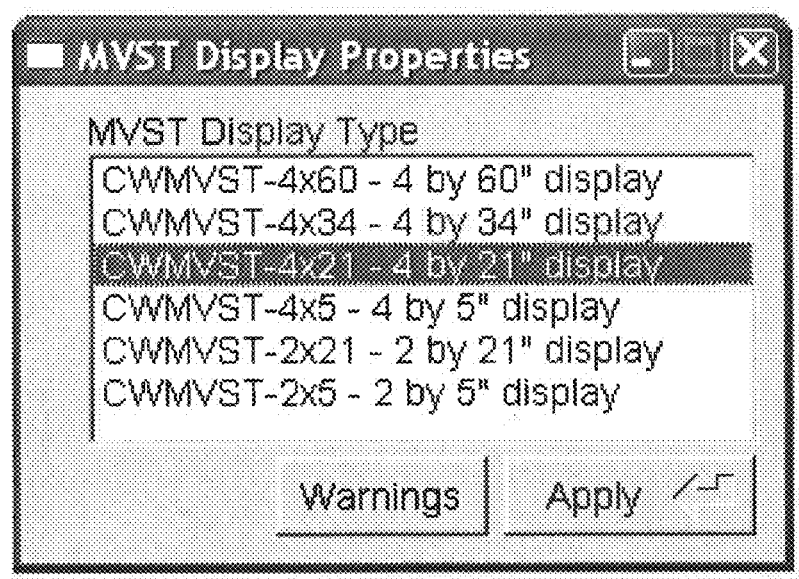
FIG. 35 is a screen shot of the CDWA depicting the dialogue box asking for the MVST to be specified for the compilation process.

The export function in the CDWA allows the designer to do a final test before completing the presentation. The export screen is shown as FIG. 32. Test runs display information regarding energy requirements and heat dissipation for a certain targeted hardware model. Heat profile graphs are provided for each motor and examples can be seen in FIG. 33. This enables the designer to visualize heat levels during the presentation relative to each motor's critical region (determined from the model file imported at the beginning of the process). Acceleration curves are also provided (examples are shown in FIG. 34) so that the designer can ensure that each motor is capable of delivering the performance characteristics that are dictated by the target choreography. Furthermore, the CDWA reports on any collisions between MVST display screens or linkages. All issues with heat profiles, acceleration profiles, or collisions, if any, are displayed as warnings after test runs are completed. At this point, the designer can also choose to compile the presentation for another MVST system, if the presentation is desired to be run on differing MVST systems. After all the issues are resolved, the designer exports compiled presentations for each target hardware model.

The CDWA exports the presentation as a package containing all the required media files, as well as an XML file containing links to all the required media and, if included, external video and audio streams. An example of the structure of the resulting XML file is attached following the detailed description of the preferred embodiment.

This package is then uploaded to online servers to be used with various MVST displays. Each MVST display has a unique IP address, allowing for content managers to connect to systems remotely to check on operation and perform administrative tasks such as setting schedules for various choreography showings by time of day (or to pre-empt normal playlists for a live event) and to set the frequency of a given show within a repeating mix of shows. The benefit of managing the system online is that it enables the content managers to access and deploy their content to multiple MVST systems from a single location. This is referred to as Internet Deployment 65 in FIG. 21.

In the event where links to real-time streams for live shows are included in a choreography package, the manager must ensure that such streams are available and live at the time the MVST showing is scheduled. For example, a MVST display normally presenting a series of promotional choreography, could be programmed to re-orient screens for a live telecast such as election night, where screens would group together to show contest maps, then break apart to simultaneously show data feeds of riding results while also displaying candidate interviews and other live video feeds. These systems might find their way into homes by including special TV or IPTV channels designed to deliver multiple streams—e.g. a hockey game, having the score, stats, and other camera views on different screens.

Another example of the invention is dynamically choreographed segments here for example, a camera mounted above the stage in a theatre or a camera integrated into one of the screens is fed directly into the choreography, optionally with some image recognition, enabling possible 'computer generated' comments about the audience or other events. For example, the computer-audience-attraction-system reads data from audience RFID tags and then modifies part of the presentation accordingly. It could also use camera input—e.g. when recognizing a pointed hat, the computer asks: "Any witches in the house," pauses, then displays the video of the "witch" on one or more of the displays and says "You—yes you, the Witch—could you please take off your hat?".

Multiple MVST display systems could also be configured as choreographed clusters—for example, along the wall of a building or around the circumference of an arena. In clusters, content can be rendered in conjunction with the choreography to appear to make the discrete breaks between MVST display systems within the cluster vanish.

To those skilled in the art, many modifications and variations of the present invention are possible in light of the above teachings. It is therefore to be understood that the present invention can be practiced otherwise than as specifically described herein and still be within the spirit and scope of the appended claims.

Example of Structure of XML File

```xml
<?xml version="1.0" encoding="UTF-8" ?>
<!-- Start XML File -->
<!DOCTYPE choreography SYSTEM "choreography.dtd">
<choreography>
    <mvstdisplay model="CWMSVT4x60" screens="4">
        <mvstbase min="-512,0,-512" max="512,0,512"/>
        <mvstscreen id="0" aspect="16:9" width="1280" height="720"/>
        <mvstscreen id="1" aspect="16:9" width="1280" height="720"/>
        <mvstscreen id="2" aspect="16:9" width="1280" height="720"/>
        <mvstscreen id="3" aspect="16:9" width="1280" height="720"/>
    </mvstdisplay>
    <title>Golf Green Number 4</title>
    <duration>10.0</duration>
    <events>
        <mvst time="0.0">
            <sound href="soundtrack.mp3"/>
            <base angle="0"/>
            <screen id="0">
                <media href="scene1golfer.avi" width="640" height="480">
                    <motion crop="50%,50%" center="240,0" angle="0">
                        <outcurve curve="averaging" curl="0.5"/>
                    </motion>
                </media>
                <motion position="-50,0,-50" angle="0">
                    <outcurve curve="averaging" curl="0.5"/>
                </motion>
            </screen>
            <screen id="1">
                <media href="scene1golfer.avi" width="640" height="480">
                    <motion crop="50%,50%" center="-240,0" angle="0">
                        <outcurve curve="averaging" curl="0.5"/>
                    </motion>
                </media>
                <motion position="-50,0,50" angle="0">
                    <outcurve curve="averaging" curl="0.5"/>
                </motion>
            </screen>
            <screen id="2">
                <media href="scene1pin.avi" width="640" height="480">
                    <motion crop="50%,50%" center="240,0" angle="-90">
                        <outcurve curve="averaging" curl="0.5"/>
                    </motion>
                </media>
                <motion position="50,0,-50" angle="0">
                    <outcurve curve="averaging" curl="0.5"/>
                </motion>
            </screen>
            <screen id="3">
                <media href="scene1pin.avi" width="640" height="480">
                    <motion crop="50%,50%" center="240,0" angle="90">
                        <outcurve curve="averaging" curl="0.5"/>
                    </motion>
                </media>
                <motion position="50,0,50" angle="0">
                    <outcurve curve="averaging" curl="0.5"/>
                </motion>
            </screen>
        </mvst>
        <mvst time="5.0">
            <screen id="0">
                <media>
                    <motion crop="50%,50%" center="240,0" angle="45">
                        <incurve curve="averaging" curl="0.5"/>
                        <outcurve curve="averaging" curl="0.5"/>
                    </motion>
                </media>
                <motion position="-50,0,-150" angle="0">
                    <incurve curve="averaging" curl="0.5"/>
                    <outcurve curve="averaging" curl="0.5"/>
                </motion>
            </screen>
            <screen id="1">
                <media>
                    <motion crop="50%,50%" center="-240,0" angle="0">
                        <incurve curve="averaging" curl="0.5"/>
                        <outcurve curve="averaging" curl="0.5"/>
                    </motion>
                </media>
                <motion position="-50,0,50" angle="0">
                    <incurve curve="averaging" curl="0.5"/>
                    <outcurve curve="averaging" curl="0.5"/>
                </motion>
            </screen>
            <screen id="2">
                <media>
                    <motion crop="50%,50%" center="240,0" angle="-90">
                        <incurve curve="averaging" curl="0.5"/>
                        <outcurve curve="averaging" curl="0.5"/>
                    </motion>
                </media>
                <motion position="125,0,-50" angle="0">
                    <incurve curve="averaging" curl="0.5"/>
                    <outcurve curve="averaging" curl="0.5"/>
                </motion>
            </screen>
            <screen id="3">
                <media>
                    <motion crop="50%,50%" center="240,0" angle="90">
                        <incurve curve="averaging" curl="0.5"/>
                        <outcurve curve="averaging" curl="0.5"/>
                    </motion>
                </media>
                <motion position="125,0,50" angle="0">
                    <incurve curve="averaging" curl="0.5"/>
                    <outcurve curve="averaging" curl="0.5"/>
                </motion>
            </screen>
        </mvst>
        <mvst time="7.5">
            <screen id="2">
                <media href="message2top.png" width="1024" height="768">
                    <motion crop="50%,50%" center="240,0" angle="-90">
                        <incurve curve="averaging" curl="0.5"/>
                        <outcurve curve="averaging" curl="0.5"/>
                    </motion>
                </media>
                <motion position="125,0,-50" angle="0">
                    <incurve curve="averaging" curl="0.5"/>
                    <outcurve curve="averaging" curl="0.5"/>
                </motion>
            </screen>
            <screen id="3">
                <media href="message2bottom.png" width="1024" height="768">
                    <motion crop="50%,50%" center="240,0" angle="90">
                        <incurve curve="averaging" curl="0.5"/>
                        <outcurve curve="averaging" curl="0.5"/>
                    </motion>
                </media>
```

-continued

```
            <motion position="125,0,50" angle="0">
                <incurve curve="avaraging" curl="0.5"/>
                <outcurve curve="averaging" curl="0.5"/>
            </motion>
        </screen>
    </mvst>
    <mvst time="10.0">
        <screen id="0">
            <media>
                <motion crop="50%,50%" center="240,0" angle="45">
                    <incurve curve="averaging" curl="0.5"/>
                </motion>
            </media>
            <motion position="-50,0,-150" angle="0">
                <incurve curve="averaging" curl="0.5"/>
            </motion>
        </screen>
        <screen id="1">
            <media>
                <motion crop="50%,50%" center="-240,0" angle="0">
                    <incurve curve="averaging" curl="0.5"/>
                </motion>
            </media>
            <motion position="-50,0,50" angle="0">
                <incurve curve="averaging" curl="0.5"/>
            </motion>
        </screen>
        <screen id="2">
            <media>
                <motion crop="50%,50%" center="240,0" angle="-90">
                    <incurve curve="averaging" curl="0.5"/>
                </motion>
            </media>
            <motion position="125,0,-50" angle="0">
                <incurve curve="averaging" curl="0.5"/>
            </motion>
        </screen>
        <screen id="3">
            <media>
                <motion crop="50%,50%" center="240,0" angle="90">
                    <incurve curve="averaging" curl="0.5"/>
                </motion>
            </media>
            <motion position="125,0,50" angle="0">
                <incurve curve="averaging" curl="0.5"/>
            </motion>
        </screen>
    </mvst>
    </events>
</choreography>
<!-- END XML File -->
```

We claim:

1. A visual display system comprising:
a plurality of electronic display devices,
a separate support arrangement for each electronic display device connected to a motor drive arrangement that accommodates movement of each electronic display device to change the orientation thereof and to accommodate substantial movement of the respective display device along first and second axes from a neutral position to any of a series of positions including stacked positions relative to the second axis;
said separate support arrangement for each electronic display device further accommodating substantial movement of the respective display device along a third axis;
said plurality of display devices, via said motor drive arrangement, are each controlled to move within a three dimensional display space in a coordinated manner and to accommodate a change in order of said display devices within said display space.

2. A visual display system as claimed in claim 1 wherein each separate support arrangement accommodates pivotal movement of each display device.

3. A visual display system as claimed in claim 1 wherein said three dimensional display space has a dominate plane of movement defined by said first and second axes.

4. A visual display system as claimed in claim 3 wherein each separate support arrangement allows rotation of said display devices within said display space such that a viewing direction perpendicular to said display devices can be altered as part of the movement of each display device.

5. A visual display system as claimed in claim 4 wherein each separate support arrangement accommodates angling of the display device for multi-plane viewing of said display devices in said display space.

6. A visual display system as claimed in claim 1 wherein said plurality of display devices is at least 4 display devices provided in pairs with the display devices of a pair being secured in a back to back manner either side of a common support arrangement.

7. A visual display system as claimed in claim 1 including a camera and an associated image processing arrangement, said camera being directed outwardly from said display space for recognition of at least one potential viewer; said associated image processing arrangement including identification and tracking of at least one recognized potential viewer and coordinating movement of said display devices to improve the likelihood of the at least one recognized potential viewer viewing the display devices of the visual display system.

8. A visual display system as claimed in claim 7 wherein said image recognition processing arrangement identifies head movement of viewers.

9. A visual display system as claimed in claim 1 including a camera directed outwardly from said display space in combination with an image processing arrangement used to identify motion and coordinating movement of said display devices at least partially based on the identified motion.

10. A visual display system as claimed in claim 1 wherein motion of said display devices is partially based on motion depicted in images shown on said display devices.

* * * * *